United States Patent
Gonzalez de Langarica et al.

(10) Patent No.: US 12,316,586 B2
(45) Date of Patent: May 27, 2025

(54) NETWORK NODES AND METHODS PERFORMED THEREIN FOR HANDLING CALL INFORMATION FOR A USER EQUIPMENT

(71) Applicant: Telefonaktiebolaget LM Ericsson (publ), Stockholm (SE)

(72) Inventors: Ester Gonzalez de Langarica, Vitoria (ES); Charles Hegarty, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 17/436,689

(22) PCT Filed: Mar. 7, 2019

(86) PCT No.: PCT/SE2019/050200
§ 371 (c)(1),
(2) Date: Sep. 7, 2021

(87) PCT Pub. No.: WO2020/180222
PCT Pub. Date: Sep. 10, 2020

(65) Prior Publication Data
US 2022/0131913 A1    Apr. 28, 2022

(51) Int. Cl.
*H04L 51/04* (2022.01)
*H04L 65/1093* (2022.01)
(Continued)

(52) U.S. Cl.
CPC .......... *H04L 51/04* (2013.01); *H04L 65/1093* (2013.01); *H04L 67/306* (2013.01); *H04M 15/55* (2013.01); *H04W 80/08* (2013.01)

(58) Field of Classification Search
CPC ...... H04M 15/55; H04M 15/41; H04M 15/43; H04M 15/50; H04M 15/62; H04M 3/568;
(Continued)

(56) References Cited

U.S. PATENT DOCUMENTS

| 2009/0089208 A1* | 4/2009 | Wu ........................ H04M 15/55 705/39 |
| 2016/0142447 A1 | 5/2016 | Mufti et al. |

(Continued)

FOREIGN PATENT DOCUMENTS

| AU | 2002353101 A1 * | 7/2003 | ............. H04L 29/06 |
| WO | WO-03058934 A1 * | 7/2003 | ............. H04L 29/06 |
| WO | WO-2018067220 A1 * | 4/2018 | ............. H04L 51/04 |

OTHER PUBLICATIONS

Rosenberg (WO 2018/067220) X Reference.*
(Continued)

*Primary Examiner* — Kyung H Shin
(74) *Attorney, Agent, or Firm* — Murphy, Bilak & Homiller, PLLC

(57) ABSTRACT

Embodiments herein relate to a method performed by a first network node (150) in a wireless communications network (100), for handling an addition of a participant to an ongoing call session for a first UE (120) handled by an IMS node (140). The ongoing call session is a session between the first UE (120) and a second UE (121). The first network node receives, from a second network node (151), a request to add a participant to an ongoing call session for the first UE (120). The first network node (150) obtains a list of one or more ongoing call sessions for the first user from the IMS node (140), wherein the list comprises an identifier for identifying each of the one or more ongoing call sessions. The first network node 150 further sends, to the IMS node (140), a request to add the participant to one of the one or more ongoing call sessions for the first UE (120), wherein the (Continued)

request comprises the identifier for identifying the call session to which the participant is to be added and an identification of the participant to add to the ongoing call session. Embodiments herein further relate to methods performed by the second network node (151) and the IMS node (140).

20 Claims, 17 Drawing Sheets

(51) Int. Cl.
*H04L 67/306* (2022.01)
*H04M 15/00* (2006.01)
*H04W 80/08* (2009.01)

(58) Field of Classification Search
CPC ...... H04M 3/4285; H04M 3/56; H04M 3/569; H04W 76/45; G06Q 20/14; G06Q 20/123; G06Q 20/10; G06Q 30/04; H04L 12/1403; H04L 12/14; H04L 67/306; H04L 65/1073; H04L 67/141; H04L 65/1093; H04L 65/403; H04L 63/101; H04L 67/146; H04L 63/102; H04L 51/04; H04L 61/4555; H04L 9/40; H04L 65/4038; H04L 67/14; G10L 17/04; G10L 17/17; G10L 17/00; G10L 17/24

See application file for complete search history.

(56) References Cited

U.S. PATENT DOCUMENTS

| | | |
|---|---|---|
| 2018/0103073 A1 | 4/2018 | Rosenberg et al. |
| 2020/0075026 A1* | 3/2020 | Peeler ............... H04L 67/306 |

OTHER PUBLICATIONS

3GPP, "3rd Generation Partnership Project; Technical Specification Group Core Network and Terminals; Conferencing using the IP Multimedia (IM) Core Network (CN) subsystem; Stage 3 (Release 14)", 3GPP TS 24.147 V14.0.03, Mar. 2017, 1-209.

Open Mobile Alliance Ltd., "NGSI Call Control and Configuration", Approved Version 1.0, Open Mobile Alliance, OMA-TS-NGSI_Call_Control_and_Configuration-V1_0-20120529-A, May 29, 2012, 1-45.

Open Mobile Alliance Ltd., "NGSI Common Definitions", Approved Version 1.0, Open Mobile Alliance, OMA-TS-NGSI_Common-V1_0-20120529-A, May 29, 2012, 1-12.

* cited by examiner

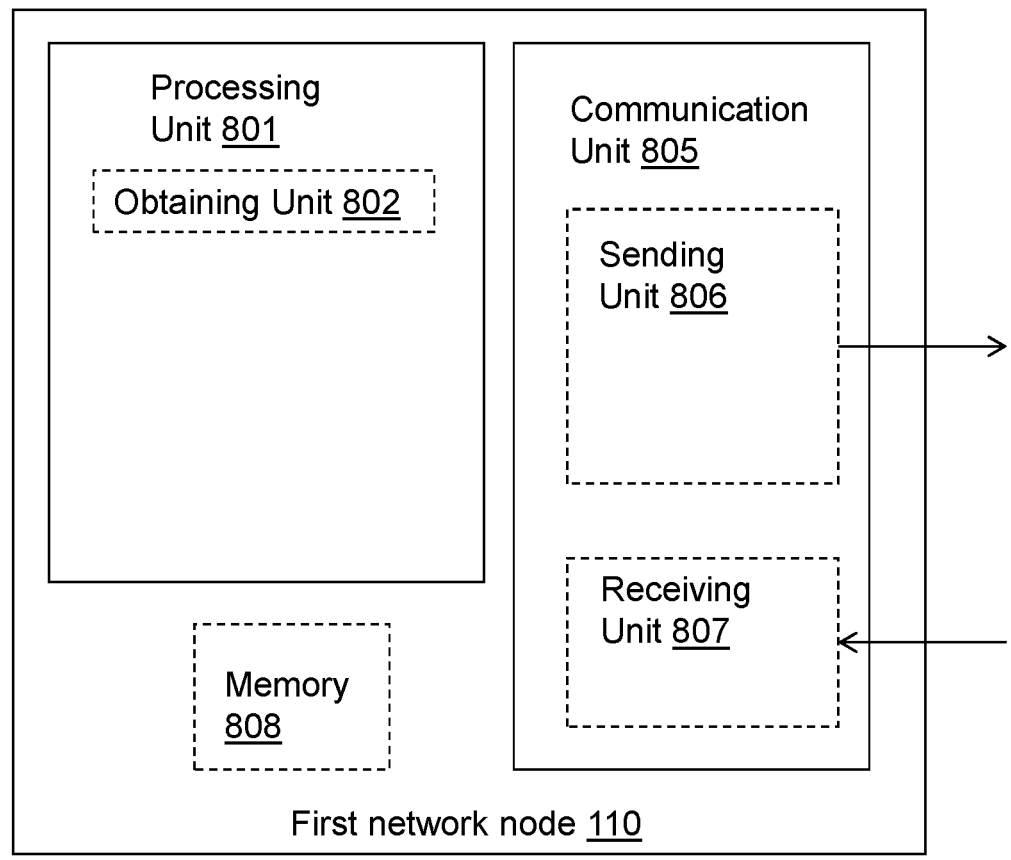
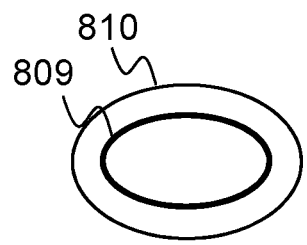
Fig. 8

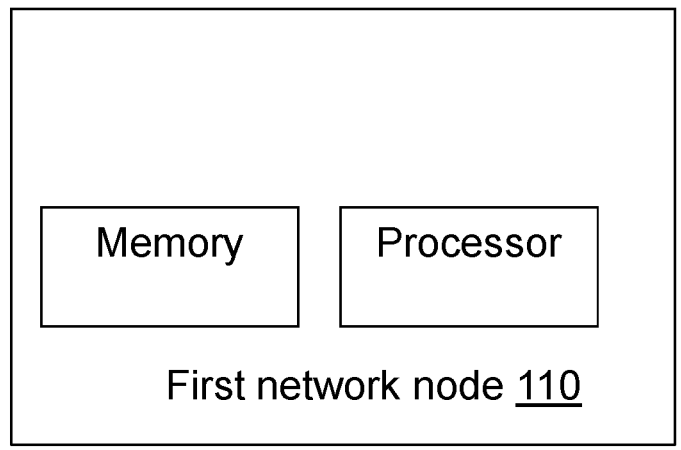
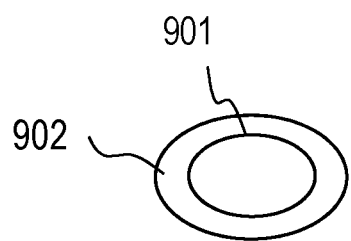
Fig. 9

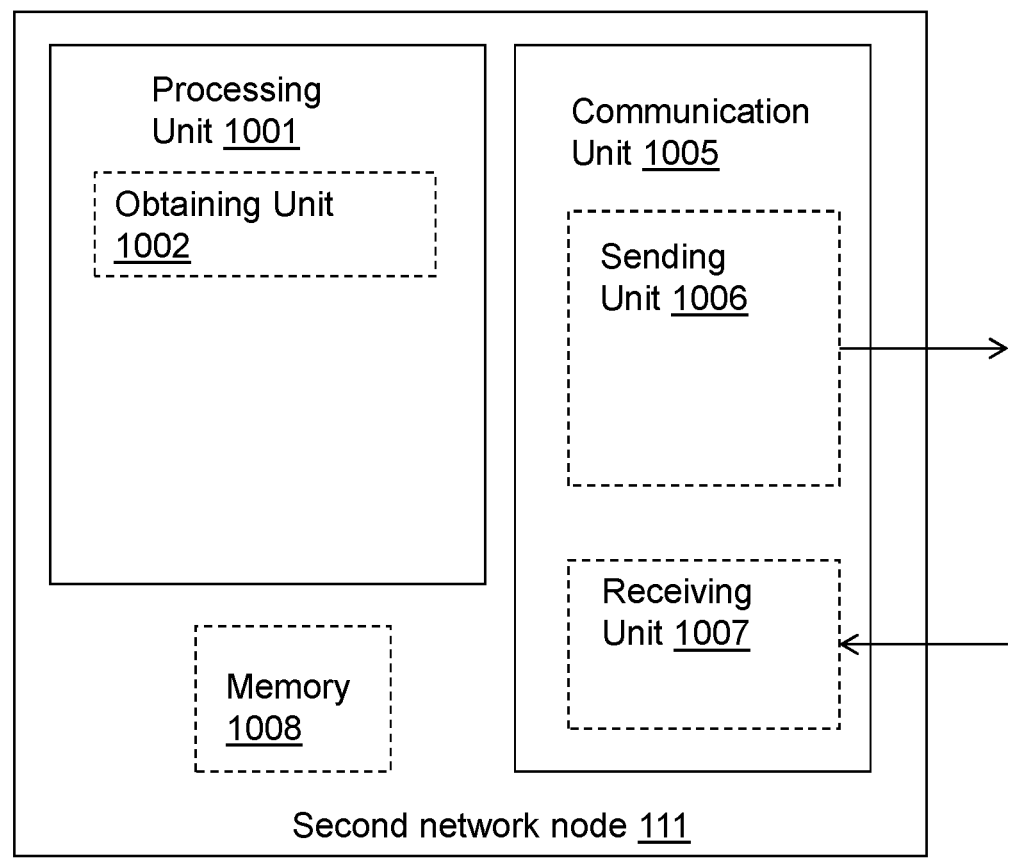
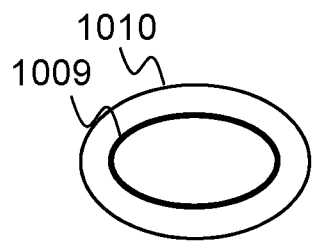
Fig. 10

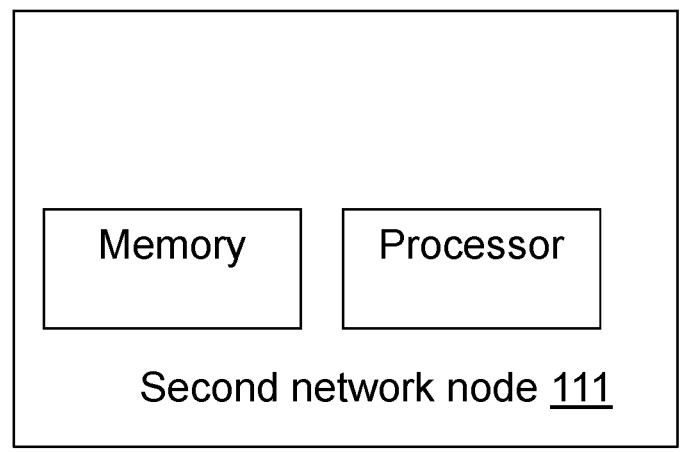
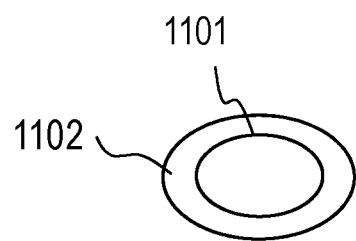
Fig. 11

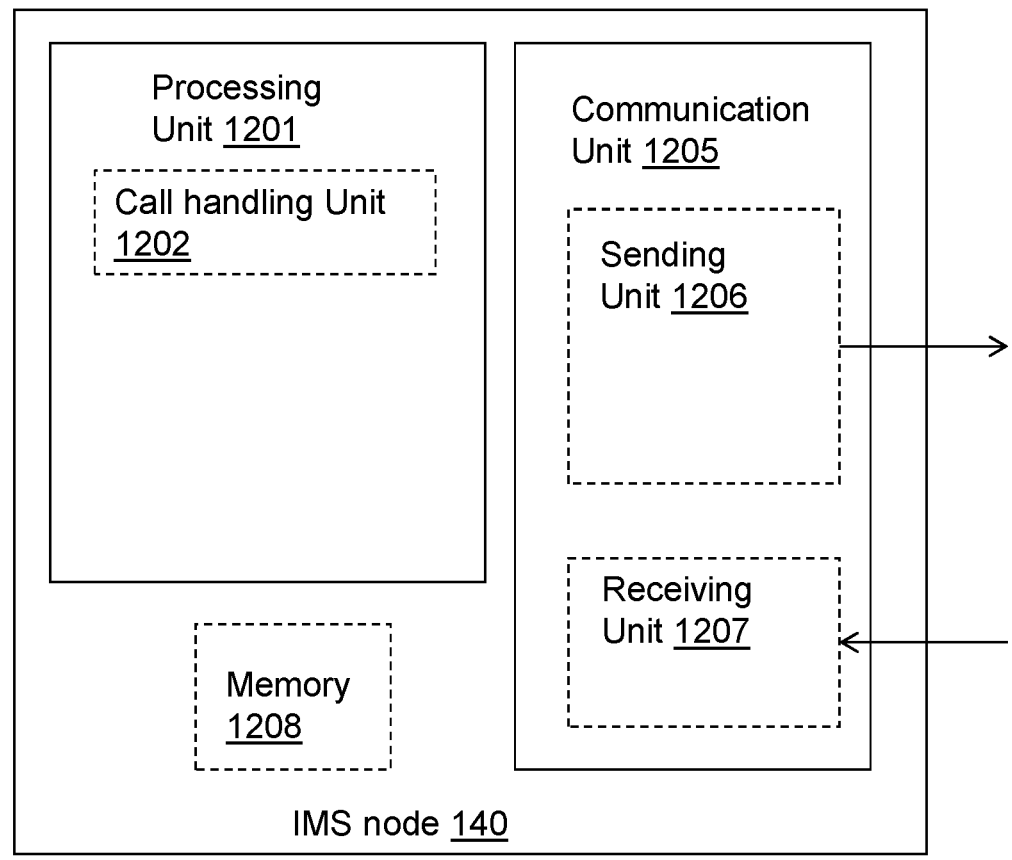
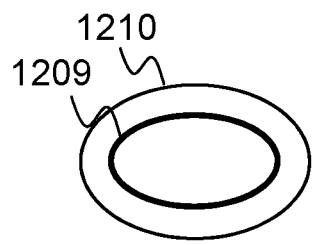
Fig. 12

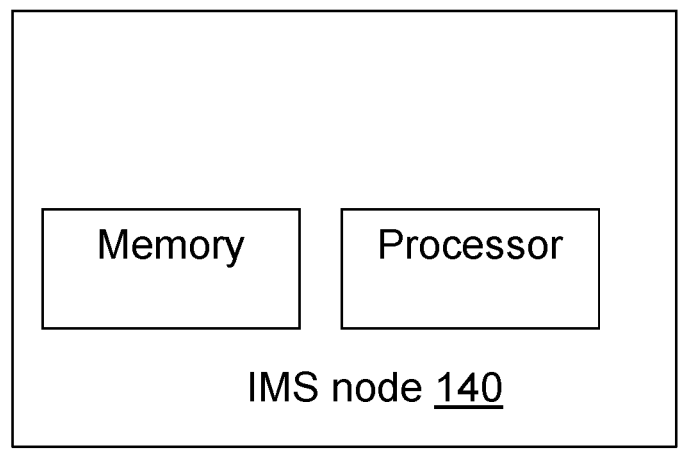
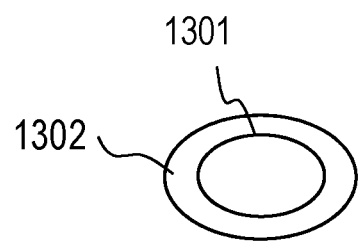
Fig. 13

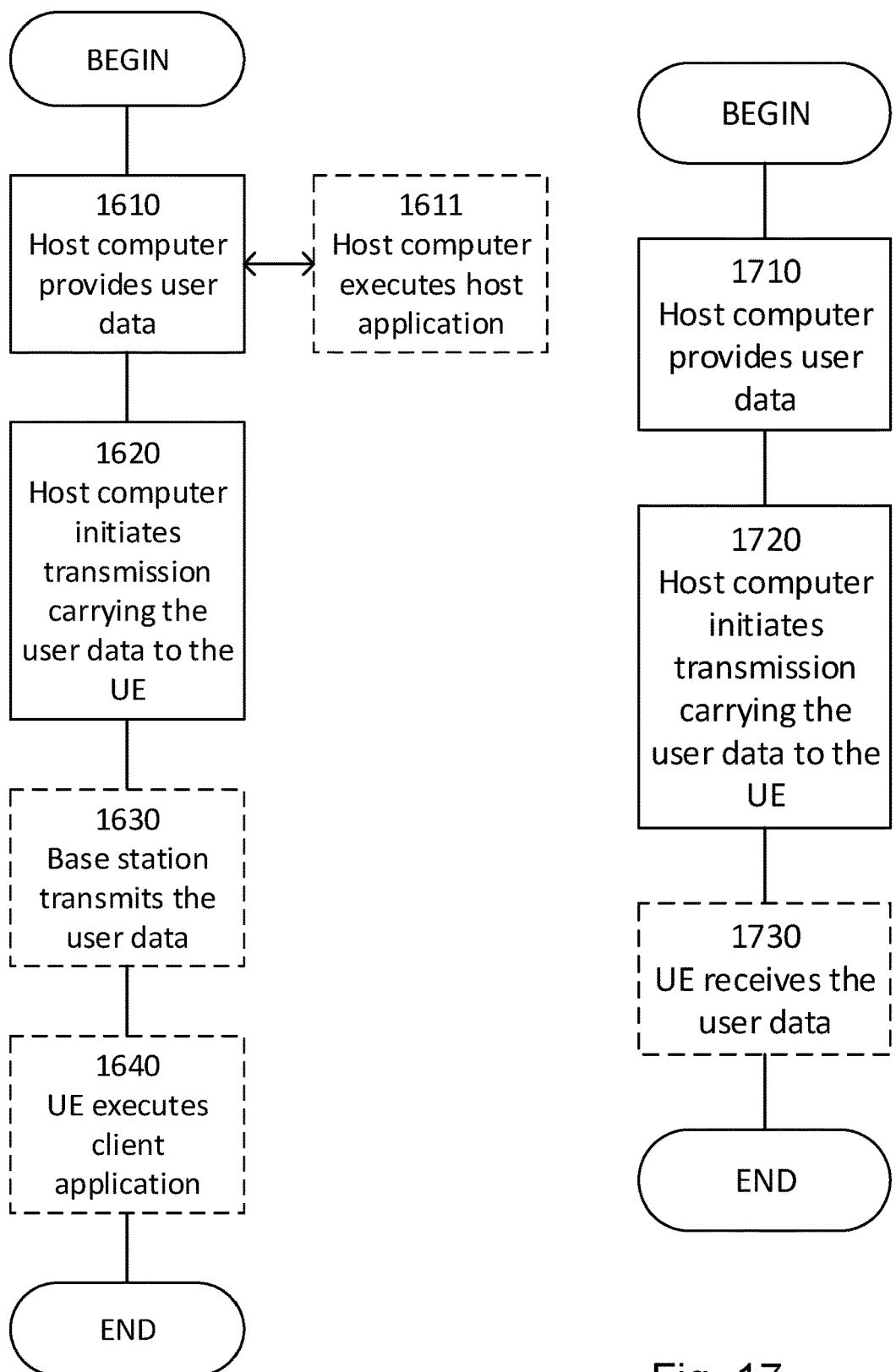

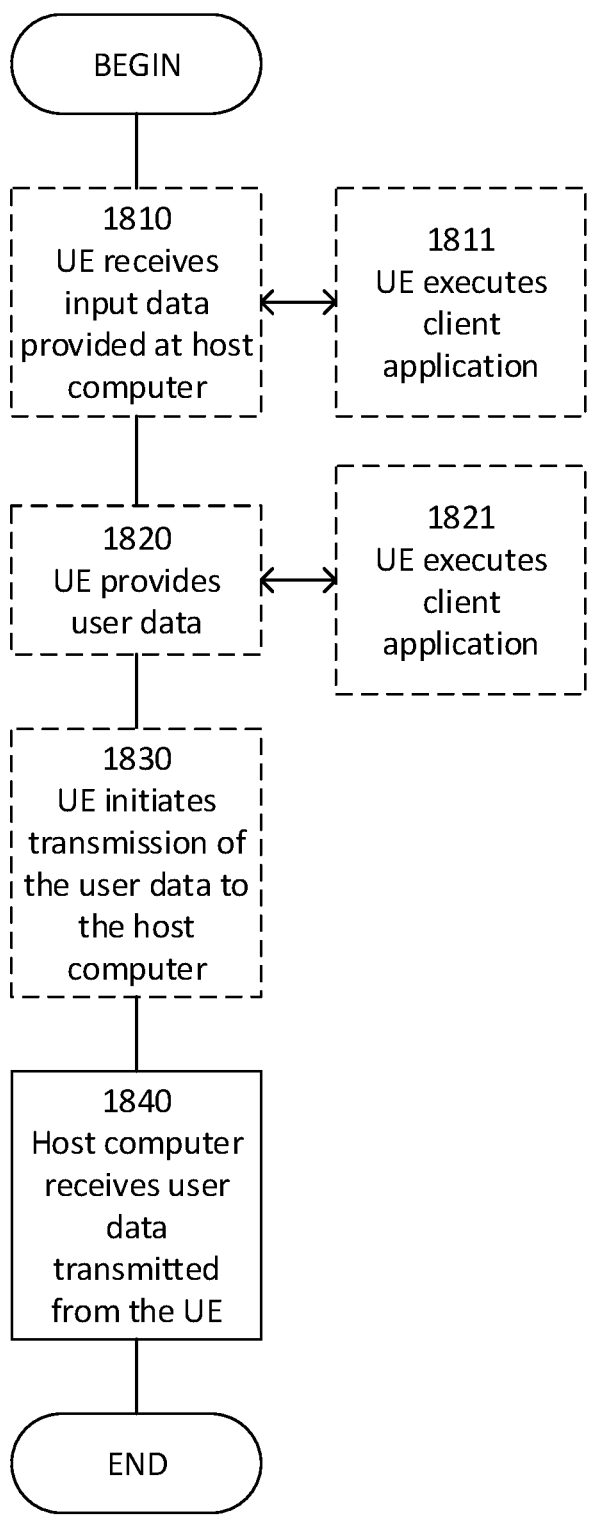
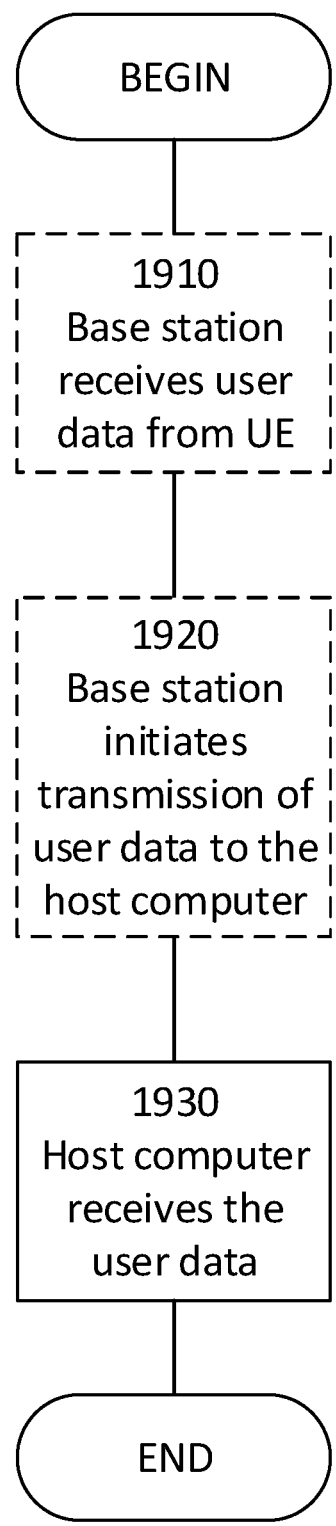
Fig. 18
Fig. 19

NETWORK NODES AND METHODS PERFORMED THEREIN FOR HANDLING CALL INFORMATION FOR A USER EQUIPMENT

TECHNICAL FIELD

Embodiments herein relate to network nodes and methods performed therein for handling call information for a User Equipment (UE) in a wireless communications network.

BACKGROUND

In a typical wireless communication network, wireless devices, also known as wireless communication devices, mobile stations, stations (STA) and/or User Equipment (UE), communicate via an access Network such as a Radio Access Network (RAN) with one or more core networks (CN) or a Wi-Fi network. The RAN covers a geographical area which is divided into service areas or cell areas, which may also be referred to as a beam or a beam group, with each service area or cell area being served by a radio network node such as a radio access node e.g., a radio base station (RBS) or a Wi-Fi access point, which in some networks may also be denoted, for example, a NodeB, eNodeB (eNB), or Next Generation NodeB (gNB) as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Over-The-Top (OTT) services have been introduced allowing a third party telecommunications service provider to provide services that are delivered across an IP network. The IP network may e.g. be a public internet or cloud services delivered via a third party access network, as opposed to a carrier's own access network. OTT may refer to a variety of services including communications, such as e.g. voice and/or messaging, content, such as e.g. TV and/or music, and cloud-based offerings, such as e.g. computing and storage.

A further OTT service is a Digital Assistant (DA). The DA may perform tasks or services upon request from a user. The DA may be implemented in several ways. A first way is commonly referred to as an operator controlled DA. The operator controls the whole DA solution without the UE being impacted. A user of the UE may provide instructions, such as e.g. voice commands, to a core network node, such as e.g. an IMS node, of the operator. The voice command may e.g. be "Digital Assistant, I want a pizza", "Digital Assistant, tell me how many devices are active right now", "Digital Assistant, set-up a conference", or "Digital Assistant, how much credit do I have?". The core network node may detect a hot word, which may also be referred to as a key word, indicating that the user is providing instructions to the DA and may forward the instructions to a network node controlled by a third party service provider, the network node may e.g. comprise a DA platform. The DA platform may e.g. be a bot of a company providing a certain service, such as e.g. a taxi service or a food delivery service. The instructions may be forwarded to the DA platform using e.g. a Session Initiation Protocol/Real-time Transport Protocol (SIP/RTP). The DA platform may comprise certain functionality, such as e.g. Speech2Text, Identification of Intents & Entities and Control & Dispatch of Intents. The DA platform may then forward the instructions to a further network node, which may e.g. be an Application Server (AS) node, which has access to the core network node via a Service Exposure Application Programming Interface (API). Thereby the DA may access the IMS node and perform services towards the core network node. The DA platform is often required to pay a fee to the operator in order to be reachable by the operator's DA users. The user may also be required to pat fees to the operator and network provider for the usage of DA services. The operator may further be required to pay fees to the network provider for every transaction performed via the Service Exposure API.

A further way to implement the DA may be to provide the user with direct access to the network node controlled by the third party service provider comprising the DA platform. This may e.g. be done using a dedicated UE having access to the first network node. This way of implementing the DA is commonly referred to as an OTT-controlled DA. One of the services that can be invoked may e.g. be a telephony services or bot, implemented by the operator.

In the operator-controlled approach, the DA is integrated in the operator network. It is aware of any ongoing call the user may wish to influence with for example mid-call services, such as e.g. call transfer, call waiting, three-party calling etc.

In the case of OTT-controlled DA, the only available mechanism for the DA to be informed about the ongoing communication of the user is via an Open Mobile Alliance (OMA) Call Notification API. However, this mechanism requires subscription and therefore a waste of resources, since resources must be freed up for subscription storing and maintenance, and state handling. Furthermore there may be a security risk by exposing the user related information to third parties via the OMA call notification API without an explicit request.

SUMMARY

It is an object of embodiments herein to enhance performance of the DA in the wireless communications network, in particular by providing a method for handling an addition of a participant to an ongoing call session for a first UE handled by an IMS node.

According to a first aspect of the embodiments herein the object is achieved by a method performed by a first network node in a wireless communications network, for handling an addition of a participant to an ongoing call session for a first UE handled by an IMS node. The ongoing call session is a session between the first UE and a second UE. The first network node receives a request to add a participant to an ongoing call session for the first UE from a second network node. The first network node obtains a list of one or more ongoing call sessions for the first user from the IMS node. The list comprises an identifier for identifying each of the one or more ongoing call sessions. The first network node sends a request to add the participant to one of the one or more ongoing call sessions for the first UE to the IMS node. The request comprises the identifier for identifying the call session to which the participant is to be added and an identification of the participant to add to the ongoing call session.

According to a second aspect of the embodiments herein the object is achieved by a second network node in the wireless communications network, for handling an addition of a participant to an ongoing call session for a first UE. The ongoing call session is handled by an IMS node. The ongoing call session is a session between the first UE and a second UE. The second network node obtains a request to add a participant to the ongoing call session from a user of the first UE. The second network node sends a request to add the participant to the ongoing call session for the first UE to the first network node.

According to a third aspect of the embodiments herein the object is achieved by a method performed by an IP Multimedia Subsystem (IMS) node in the wireless communications network, for handling an addition of a participant to an ongoing call session for the first UE. The ongoing call session is handled by the IMS node. The ongoing call session is a session between the first UE and the second UE. The IMS node receives a request for ongoing call sessions for the first UE from the first network node. The IMS node sends a list of one or more ongoing call sessions for the first user from the IMS node to the first network node. The list comprises an identifier for identifying each of the one or more ongoing call sessions. The IMS node receives a request to add the participant to one of the one or more ongoing call sessions for the first UE from the first network node. The request comprises the identifier for identifying the ongoing call session to which the participant is to be added and an identification of the participant to add to the ongoing call session.

According to a fourth aspect of the embodiments herein the object is achieved by a first network node in the wireless communications network, for handling an addition of a participant to an ongoing call session for a first UE handled by an IMS node. The ongoing call session is a session between the first UE and a second UE. The first network node is configured to receive a request to add a participant to an ongoing call session for the first UE, from the second network node. The first network node is configured to obtain a list of one or more ongoing call sessions for the first user from the IMS node. The list comprises an identifier for identifying each of the one or more ongoing call sessions. The first network node is further configured to send, to the IMS node, a request to add the participant to one of the one or more ongoing call sessions for the first UE. The request comprises the identifier for identifying the call session to which the participant is to be added and an identification of the participant to add to the ongoing call session.

According to a fifth aspect of the embodiments herein the object is achieved by a second network node in the wireless communications network, for handling an addition of a participant to an ongoing call session for a first UE. The ongoing call session is handled by the IMS node. The ongoing call session is a session between the first UE and a second UE. The second network node is configured to obtain, from a user of the first UE, a request to add a participant to the ongoing call session. The second network node is configured to send, to the first network node, a request to add the participant to the ongoing call session for the first UE.

According to a sixth aspect of the embodiments herein the object is achieved by an IMS node in the wireless communications network, for handling an addition of a participant to an ongoing call session for the first UE. The ongoing call session is handled by the IMS node. The ongoing call session is a session between the first UE and a second UE. The IMS node is configured to receive, from the first network node, a request for ongoing call sessions for the first UE. The IMS node is configured to send, to the first network node, a list of one or more ongoing call sessions for the first user from the IMS node. The list comprises an identifier for identifying each of the one or more ongoing call sessions. The IMS node is configured to receive, from the first network node, a request to add the participant to one of the one or more ongoing call sessions for the first UE. The request comprises the identifier for identifying the ongoing call session to which the participant is to be added and an identification of the participant to add to the ongoing call session.

According to a seventh aspect of the embodiments herein the object is achieved by a computer program product comprising instructions, which when executed by at least one processor, causes the at least one processor to perform the method according to the first aspect of embodiments herein.

According to an eight aspect of the embodiments herein the object is achieved by a carrier comprising the computer program product according to the third aspect of embodiments herein, wherein the carrier is one of an electronic signal, an optical signal, an electromagnetic signal, a magnetic signal, an electric signal, a radio signal, a microwave signal, or a computer-readable storage medium.

The proposed solution provides a more efficient integration between the second network node, such as the OTT DA, and the IMS network. The embodiments thus provide a dynamic "fetch" mechanism, from the Digital Assistant, such as the second network node, to the network, such as the IMS node, with user consent instead of a dynamic server to client notification behavior.

BRIEF DESCRIPTION OF THE DRAWINGS

The embodiments herein will now be described and explained in more detail in relation to the enclosed drawings, in which:

FIG. 8 is a schematic block diagram illustrating some first embodiments of the first network node;

FIG. 9 is a schematic block diagram illustrating some second embodiments of the first network node;

FIG. 10 is a schematic block diagram illustrating some first embodiments of the second network node;

FIG. 11 is a schematic block diagram illustrating some second embodiments of the second network node;

FIG. 12 is a schematic block diagram illustrating some first embodiments of the IMS node;

FIG. 13 is a schematic block diagram illustrating some second embodiments of the IMS node;

FIG. 16 is a flowchart depicting methods implemented in a communication system including a host computer, a base station and a user equipment in accordance with some embodiments;

FIG. 17 is a flowchart depicting methods implemented in a communication system including a host computer, a base station and a user equipment in accordance with some embodiments;

FIG. 18 is a flowchart depicting methods implemented in a communication system including a host computer, a base station and a user equipment in accordance with some embodiments;

FIG. 19 is a flowchart depicting methods implemented in a communication system including a host computer, a base station and a user equipment in accordance with some embodiments.

DETAILED DESCRIPTION

Figure 1:
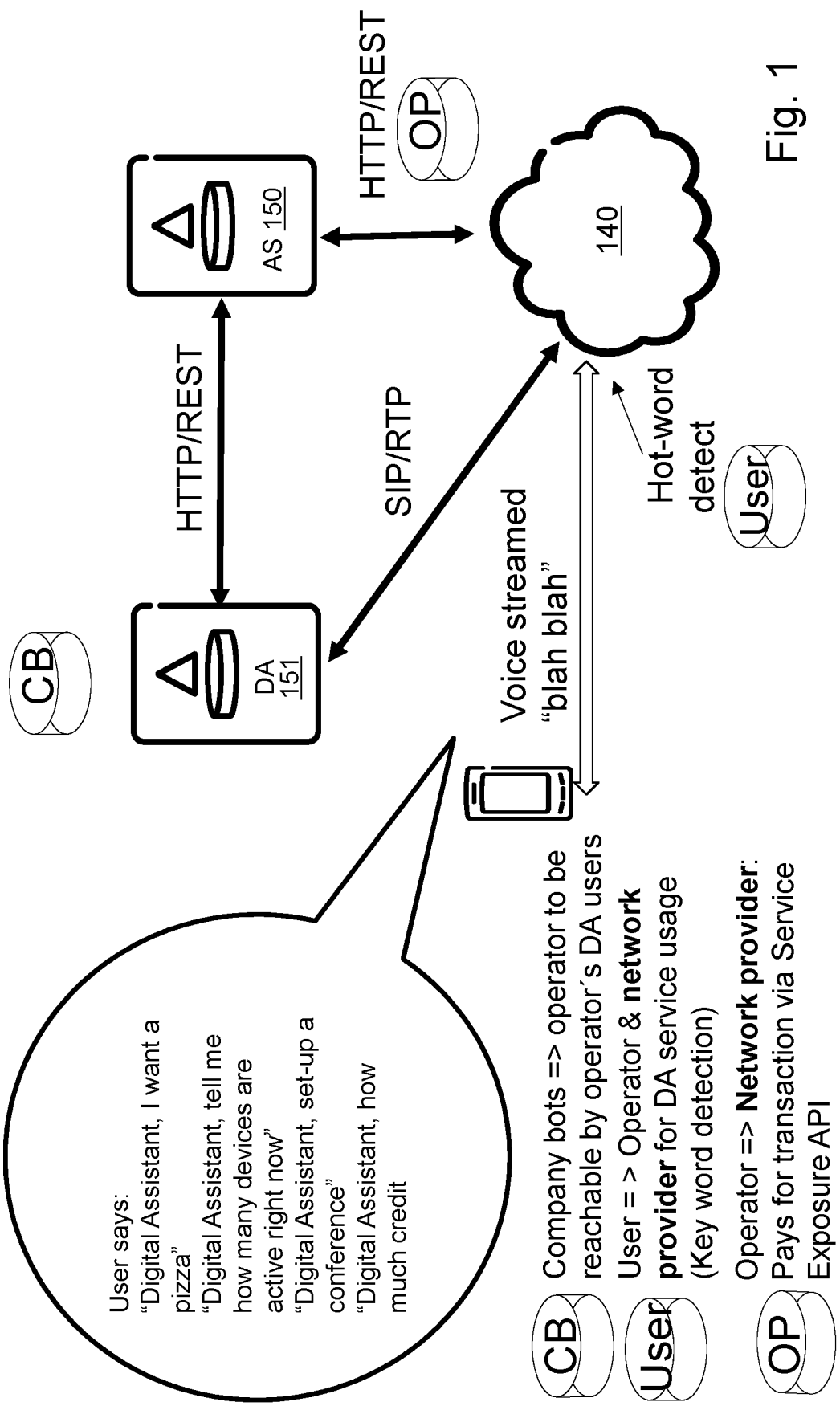
FIG. 1 is a schematic overview depicting a known solution for handling digital assistants in a communications network.

FIG. 1 shows the known operator controlled DA solution. The operator (OP) controls the whole DA solution without the UE 120 being involved. A user of the UE may provide instructions, such as e.g. voice commands, to the core network node 140, such as e.g. an IMS node, of the operator. The voice command may e.g. be "Digital Assistant, I want a pizza", "Digital Assistant, tell me how many devices are active right now", "Digital Assistant, set-up a conference", or "Digital Assistant, how much credit do I have?". The core network node 140 may detect a hot word, which may also be referred to as a key word, indicating that the user is providing instructions to the DA and may forward the instructions to a network node 151 controlled by a third party service provider, the network node 151 may e.g. comprise a DA platform. The DA platform may e.g. be a bot of a company providing a certain service, such as e.g. a taxi service or a food delivery service. The bot of the company may also be referred to as a Company Bot (CB). The instructions may be forwarded to the DA platform using e.g. a Session Initiation Protocol/Real-time Transport Protocol (SIP/RTP). The DA platform may comprise certain functionality, such as e.g. Speech2Text, Identification of Intents & Entities and Control & Dispatch of Intents. The DA platform may then forward the instructions to a further network node 150, which may e.g. be an Application Server (AS) node, which has access to the core network node 140 via a Service Exposure Application Programming Interface (API). Thereby the DA may access the IMS node and perform services towards the core network node. The DA platform is required to pay a fee to the operator in order to be reachable by the operator's DA users. The user is also required to pay fees to the operator and network provider for the usage of DA services. The operator is further required to pay fees to the network provider for every transaction performed via the Service Exposure API. Hence, this solution is very complex from an invoicing perspective. Since the DA is integrated in the operator network, it is also aware of any ongoing call the user may wish to influence with for example mid-call services, such as e.g. call transfer, call waiting, three-party calling etc. There may therefore be a security risk by exposing the user related information to the third party DA.

The embodiments herein therefore provide a solution for an efficient and secure integration between a third party network node, such as the OTT DA, and a core network for handling call information for a first UE.

Figure 2:
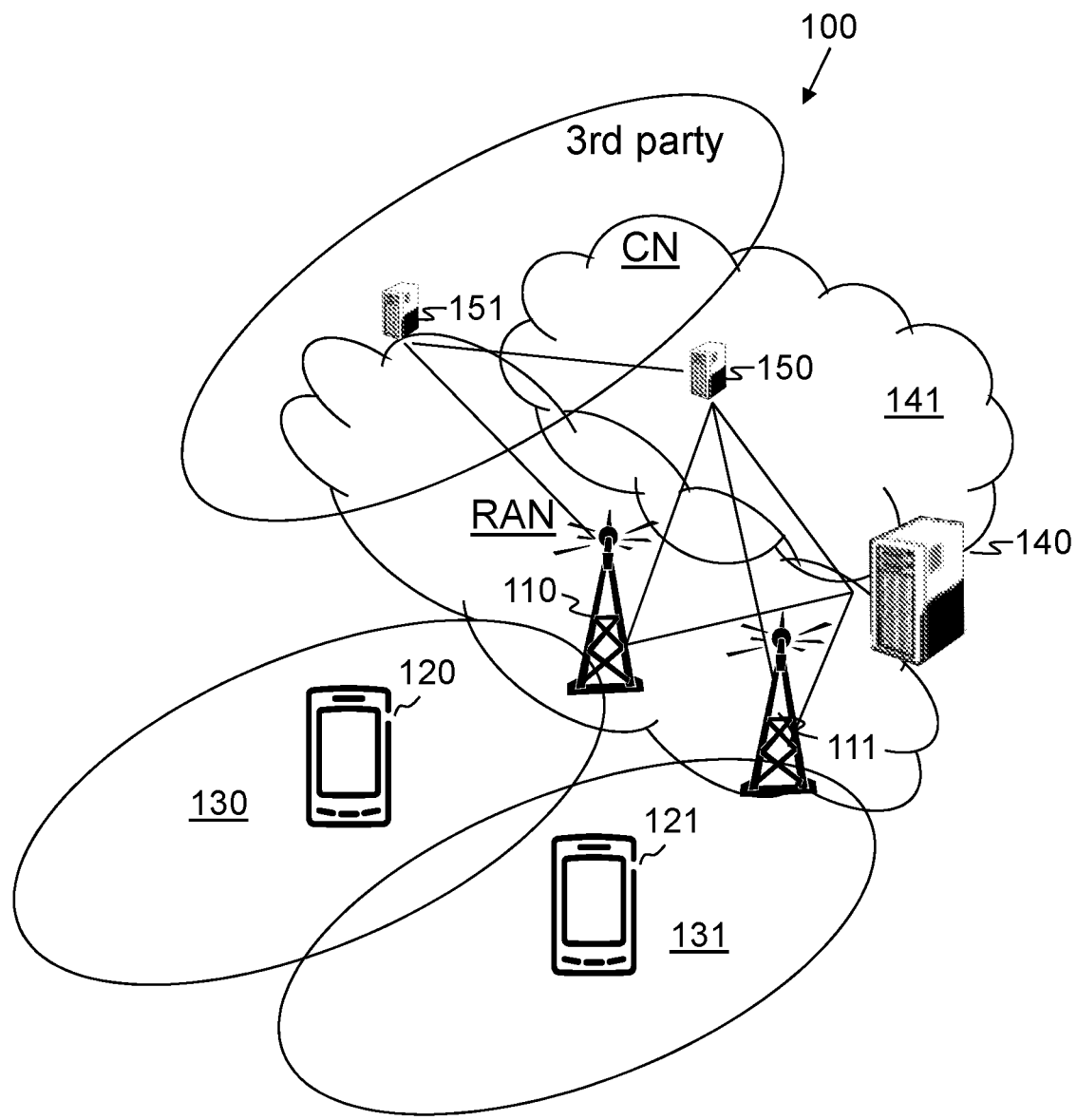
FIG. 2 is a schematic overview depicting a wireless communications network.

FIG. 2 depicts an example of a communications network 100 according to a first scenario in which embodiments herein may be implemented. The communications network 100 is a wireless communication network such as e.g. a 5G, LTE, E-Utran, WCDMA, GSM network, any 3GPP cellular network, Wimax, or any cellular network or system.

The communications network 100 comprises a RAN and a CN. The communication network 100 may use any of a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB), or Wi-Fi, just to mention a few possible implementations. In the communication network 100, one or more UEs 120, 121 may communicate via one or more Access Networks (AN), e.g. RAN, with one or more CNs. The UE 120 may e.g. be a wireless device (WD), a mobile station, a non-access point (non-AP) STA, a STA, a Digital Assistant (DA) and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, including the two shown radio network nodes 110, 111 each providing radio coverage over one or more geographical areas, such as a cell 130, 131, using a radio access technology (RAT), such as 5G, LTE, UMTS, Wi-Fi or similar. The radio network node 110, 111 may be a radio access network node such as a radio network controller or an access point such as a wireless local area network (WLAN) access point or an Access Point Station (AP STA), an access controller, a base station, e.g. a radio base station such as a gNB, NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the radio access technology and terminology used.

The CN further comprises a core network node 140, which is configured to communicate with the radio network nodes 110, 111, via e.g. an S1 interface. The core network node may e.g. be a an IMS node, a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may be connected to a network node 150 located in a same operator domain as the first core network node 140, wherein the network node 150 may act as a gateway to a network node 151 located in a $3^{rd}$ party domain of the communications network 100. The core network node 140 and the network nodes 150, 151 may be collocated nodes, stand-alone nodes or distributed nodes comprised in a cloud 141.

The UE 120 is located in the cell 130 of the network node 110, which is referred to as the serving cell, whereas the cell 131 of the network node 111 is referred to as a neighboring cell. Although, the network node 110 in FIG. 1 is only depicted providing radio coverage in a serving cell 130, the same network node 110 may further provide radio coverage in one or more neighboring cells 131 in addition to the serving cell 130.

The UE 120 may further be configured to communicate over a plurality of different RATs, such as 5G, LTE, UMTS, Wi-Fi or similar.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

Figure 3:
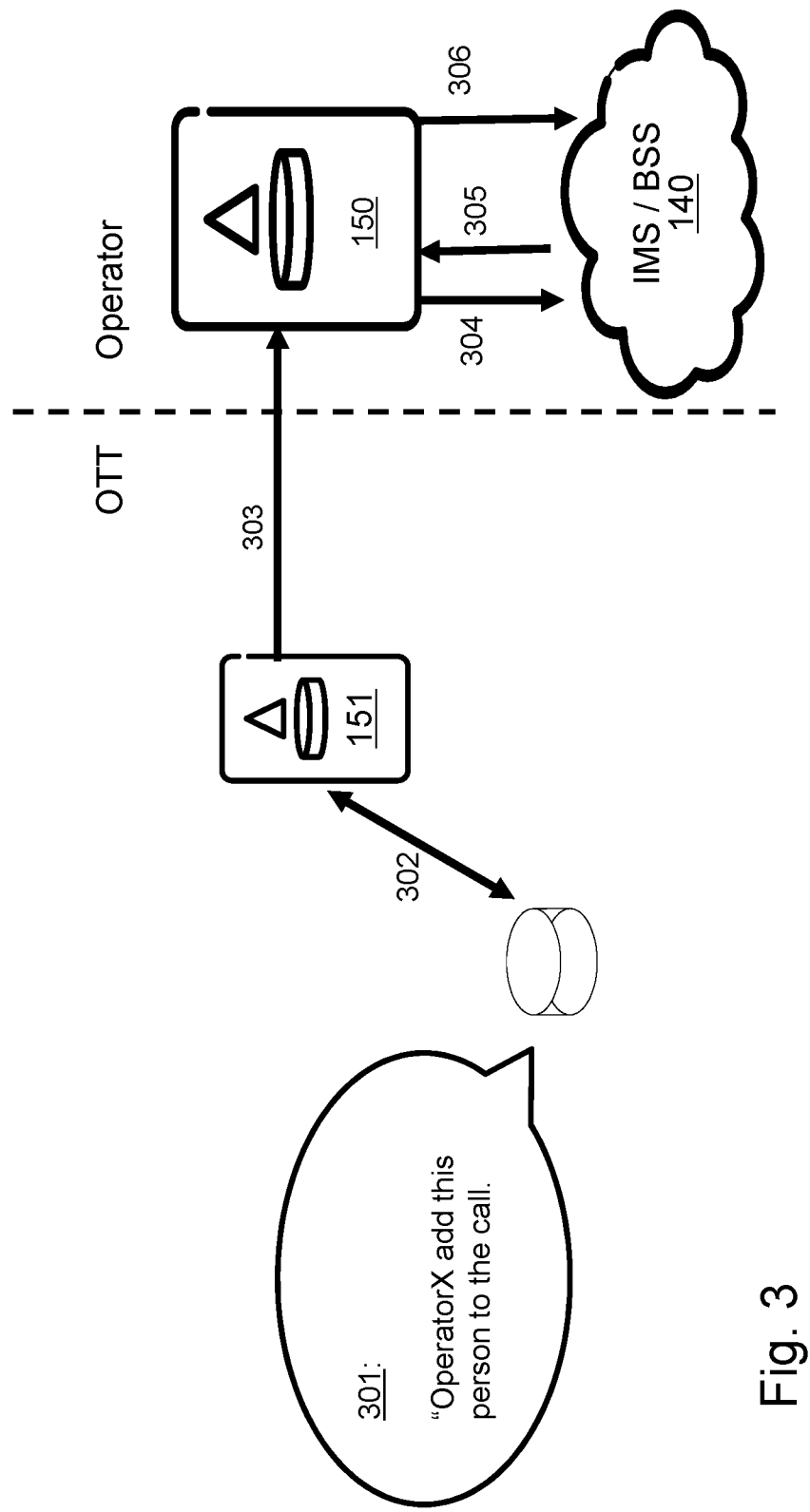
FIG. 3 is a schematic overview depicting a method for handling an addition of a participant to an ongoing call session for a first UE according to a first embodiment herein.

FIG. 3 shows a first use case of the embodiments herein. In this first case a user is engaged in a single call, which may also be referred to as a first call session. The call is handled by the IMS node 140. The call may be a call between a first UE 120 of the user and a second UE 121 of a first call participant. The user has also access to an OTT node in the form of a DA. The DA may be an OTT node comprised in the wireless communications network 100. When the user wants to add a participant to the ongoing call the user may instruct the DA to perform the addition of the participant to the existing call session.

Action 301: The second network node 151 obtains input from the user indicating that the user wishes to add a participant to the ongoing call. The user input may e.g. be obtained by voice command from the user which may be provided to a UE connected to the second network node 151. The user input may e.g. be: "OperatorX add this person to the call".

Action 302: The second network node 151 may then determine, based on the user input "add this person to the call", that a participant is to be added to an existing call.

Action 303: The second network node 151 sends a message, to the first network node 150, wherein the message indicates an intent to add a participant to an existing call. The first network node 150 may be located within a security domain of the operator but outside the IMS network. The message may comprise an information element (IE) which may be referred to as "Add_new_person_intent". The first network node 150 may be an Application Server node, such as e.g. an MMTel AS node, in a mobile operator network or in a third party network.

Action 304: The first network node 150 sends a request for ongoing call sessions to the IMS node 140 handling the call sessions for the UE 120 of the user. The user will herein be referred to as User A. The request may e.g. be sent using a Hypertext Transfer Protocol/Representational State Transfer (HTTP/REST) command, which may comprise an IE to as "getCurrentCalls (A)".

Action 305: The IMS node 140 returns a list of ongoing calls, in this case a single call indicated by an ICID1, to the first network node 150. The list may e.g. be a list comprising an IMS Charging ID (ICID) for the call session and the participant X of the ongoing call, which may be indicated in an IE referred to as "ICID_list". The IE ICID_list may thus comprise {ICID1, X}"

Action 306: The first network node 150 sends a request to add the participant to the existing call to the IMS node 140. The request comprises the indication of the call session, in this case the ICID, and an indication of the new participant to add to the call. The request may comprise an IE which may be referred to as "addParticipanttotheCall (ICID1, new_participant)".

Typically, a user of the UE 120 is only involved in a single call. However, in some embodiments the user may also be involved in a plurality of calls. In case the user is engaged in two or more different calls there will thus be required a dialog between the user and the DA, such as e.g. a DA logic comprised in the DA, which may e.g. be referred to as a skill server or and Agent, in order to determine which call the user wants to affect, e.g. which ongoing call the user wants to add a participant to. In this case d Action 401: The second network node 151 obtains input from the user indicating that the user wishes to add a participant to the ongoing call. The user input may e.g. be obtained by voice command from the user which may be provided to a UE connected to the second network node 151. The voice command may e.g. be: "OperatorX add this person to the call".

Action 402: The second network node 151 may then determine, based on the user input that a participant is to be added to an existing call. The user input may e.g. be a voice command, such as "add this person to the call".

Action 403: The second network node 151 sends the message, to the first network node 150, wherein the message indicates an intent to add a participant to an existing call. The message may comprise an IE which may be referred to as "Add_new_person_intent". The first network node 150 may be an Application Server node such as e.g. an MMTel AS node.

Action 404: The first network node 150 sends the request for ongoing call sessions to the IMS node 140 handling the call sessions for the UE 120 of the user. The user will herein be referred to as User A. The request may e.g. be sent using a Hypertext Transfer Protocol/Representational State Transfer (HTTP/REST) command, which may comprise an IE to as "getCurrentCalls (A)".

Action 405: The IMS node 140 returns the list of ongoing calls to the first network node 150. In this case the list comprises two ongoing call sessions. The call sessions may e.g. be indicated with the IMS Charging ID (ICID), indicated in the IE referred to as "ICID_list". In this case the IE call_list comprises the ICID_X and the participant X for the first call session and the ICID_Y and the participant Y for the second call session of the user, i.e. call_list={ICID_X, X; ICID_Y, Y}

Action 406: The first network node 150 sends a request, which may also be referred to as an inquiry, to the second network node 151, to identify which one of the calls the participant should be added to, such as e.g. "call with X with or with Y"?

Action 407: The second network node 151 requests user input regarding which call the participant is to be added to. The second network node may e.g. use a voice command to ask the user which one of the calls the participant should be added to, such as e.g. "call with X or call with Y"?

Action 408: The second network node 151 obtains user input indicating the call out of the two ongoing calls that the participant shall be added to. The second network node 151 may e.g. indicate the call by using a voice command, such as e.g.: "Call with X"

Action 409: The second network node 151 determine, based on the user input the existing call to which the participant is to be added, in this case the call with participant X.

Action 410: The second network node 151 sends a message, to the first network node 150, wherein the message indicates that the participant is to be added to the existing call indicated by the user, in this case "Call with X".

Action 411: The first network node 150 sends a request to add the participant to the existing call to the IMS node 140. The request comprises the indication of the call session, in this case the ICID_X, and an indication of the new participant to add to the call. The request may comprise an IE which may be referred to as addParticipanttotheCall, which IE comprises the ICID_X and the identification of the new participant.

The embodiments herein for obtaining information regarding the ongoing calls for a user in the IMS may e.g. be implemented by means of a new MMTel API.

The identifier used to identify the call may be an IMS Charging ID (ICID) or an IMS session ID.

The embodiments herein provide a dynamic fetch mechanism for identifying the call the user is referring to while talking to the DA in an OTT-controlled model.

The new API may comprise the following IEs:
1.1.1 getListofCallsWhereUserIsInvolved
   Parameter: A identity
   Returns: list of ICID-s or session ids where user A is currently involved
1.1.2 addParticipantToCall
   Parameter: ICID identifies the ongoing call
   Parameter: new_participant. User identifier to be added to the call.
   Returns: nothing In the first scenario, shown in FIG. 3, where the user is involved in only one single call: show that the first network node 150, or an application executed by the first network node 150, invokes a method getListofCallsWhereUserISInvolved (A) and since only one call will be returned returned, it will directly invoke the addParticipantToTheCall (ICID, C).

Figure 4:
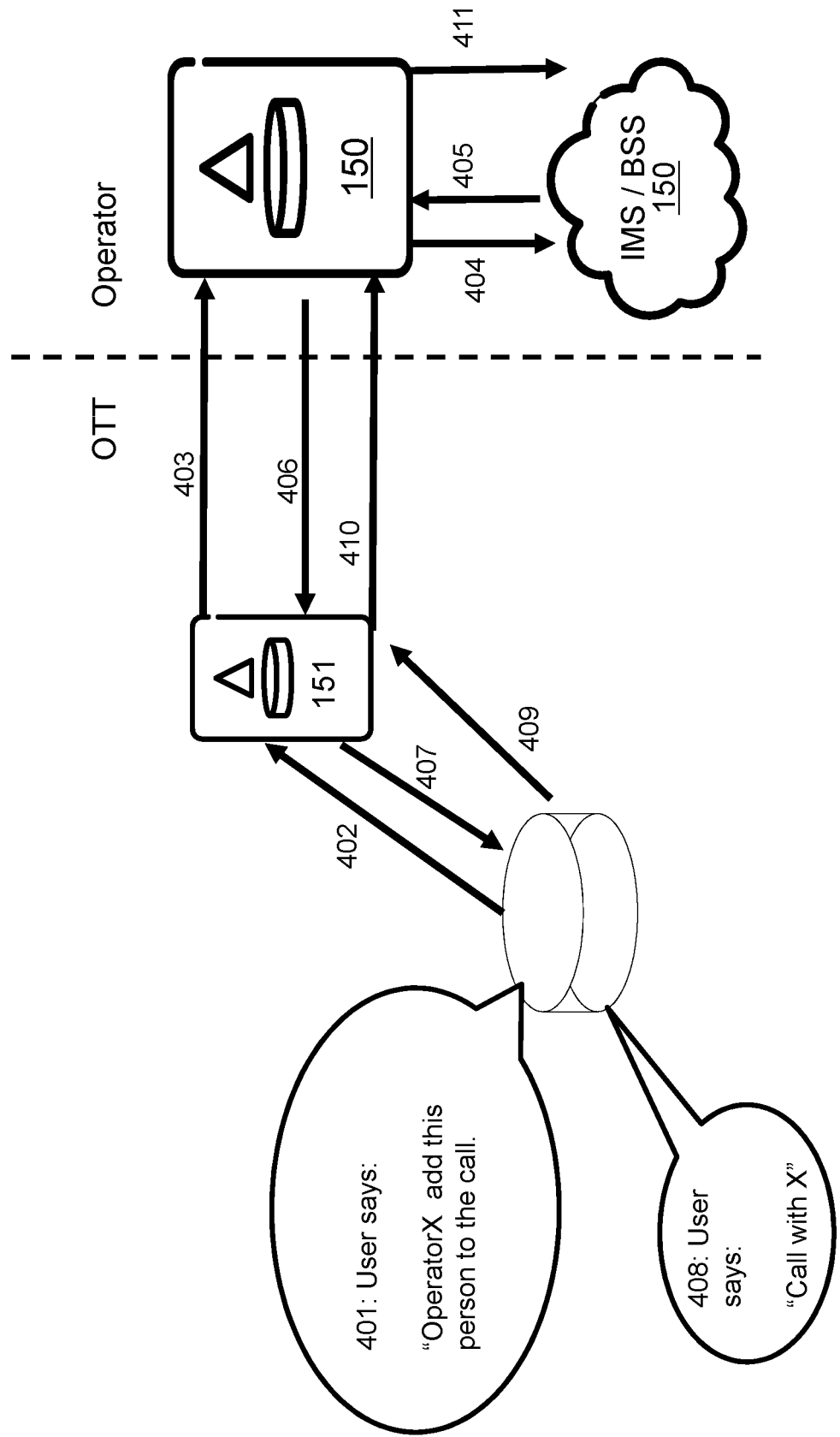
FIG. 4 is a schematic overview depicting the method for handling an addition of a participant to an ongoing call session for a first UE according to some further embodiments herein.

In the second scenario, shown in FIG. 4, where the user is involved in at least two calls, show that the first network node 150, or the application executed by the first network node 150, invokes the method getListofCallsWhereUserIsInvolved (A) and since it returns multiple values, interact with the user to ask which call in particular the user refers to.

The embodiments herein provide a solution for providing access to information regarding current sessions for a particular user from the IMS network, and for allowing the DA to identify which call the user is referring to, based on this information.

Some actions performed by the first network node 150 in the wireless communications network 100, for handling an addition of a participant to an ongoing call session for a first UE 120 handled by the IMS node 140 according to embodiments herein will now be described with reference to a flowchart depicted in FIG. 5. The ongoing call session is a session between the first UE 120 and a second UE 121. Actions that should be performed in some embodiments only are marked with dashed boxes.

Action 5010: The first network node 150 receives, from a second network node 151, a request to add a participant to an ongoing call session for the first UE 120. The second network node 151 may e.g. be a DA node. This action 5010 corresponds to action 303 described with regards to FIG. 3 and action 403 described with regards to FIG. 4.

Action 5020: The first network node 150 obtains a list of one or more ongoing call sessions for the first user from the IMS node 140, wherein the list comprises an identifier for identifying each of the one or more ongoing call sessions. The identifier for identifying the one or more ongoing call sessions may e.g. be an IMS Charging ID and/or an IMS session ID. The IMS node 140 may e.g. be a Billing Support System (BSS) node. This action 5020 is similar to action 304 and 305 described with regards to FIG. 3 and action 404 and 405 described with regards to FIG. 4. The first network node 150 may e.g. obtain the list of the one or more ongoing calls by using the IE "getListofCallsWhereUserIsInvolved" which may request an identity from the IMS node 140 and may return a list of ICID-s or session ids where user A, i.e. the first user, is currently involved.

Action 5030: When the list obtained from the IMS node 140 comprises more than one ongoing call sessions, the first network node 150 may send, to the second network node 151, a request to indicate the call session out of the more than one ongoing call sessions to which the participant is to be added. The message may comprise the identifier for identifying each of the more than one ongoing call sessions. This action 5030 corresponds to action 406 described with regards to FIG. 4.

Action 5040: The first network node 150 may receive, from the second network node 151, a message comprising the identifier for the call session out of the one or more call sessions which the participant is to be added to. This action 5040 corresponds to action 410 described with regards to FIG. 4.

Action 5050: The first network node 150 sends a request to add the participant to one of the one or more ongoing call sessions for the first UE 120 to the IMS node 140. The request comprises the identifier for identifying the call session to which the participant is to be added and an identification of the participant to add to the ongoing call session.

When the first UE 120 has a plurality of ongoing call sessions the request sent to the IMS node 140 to add the participant to one of the one or more ongoing call sessions may comprise the identifier for the ongoing call session out of the one or more call sessions comprised in the list obtained from the IMS node 140. This action 5050 corresponds to action 306 described with regards to FIG. 3 and action 411 described with regards to FIG. 4.

The first network node 150 may e.g. obtain the list of the one or more ongoing calls by using the IE "addParticipantToCall" which may comprise the ICID identifying the ongoing call, and a parameter "new_participant" which is a user identifier for identifying the user to be added to the call.

Some actions performed by the second network node 151 in the wireless communications network 100, for handling an addition of a participant to an ongoing call session for the first UE 120, according to embodiments herein will now be described with reference to a flowchart depicted in FIG. 6. The wireless communications network 100 comprises the first network node 150 and the IMS node 140. The ongoing call session is handled by the IMS node 140. The ongoing call session is a session between the first UE 120 and a second UE 121. The second network node 151 may be a DA node. Actions that should be performed in some embodiments only are marked with dashed boxes.

Action 6010: The second network node 151 obtains a request to add a participant to the ongoing call session from a user of the first UE 120. This action 6010 corresponds to action 301 described with regards to FIG. 3 and action 401 described with regards to FIG. 4.

Action 6020: The second network node 151 sends, to the first network node 150, a request to add the participant to the ongoing call session for the first UE 120. This action 6020 corresponds to action 303 described with regards to FIG. 3 and action 403 described with regards to FIG. 4.

Action 6030: The second network node 151 may, when the first UE 120 is engaged in more than one ongoing call sessions, receive a request to indicate the call session out of the more than one ongoing call sessions to which the participant is to be added from the first network node 150. The message may comprise the identifier for identifying each of the more than one ongoing call sessions. The identifier for identifying the one or more ongoing call sessions may be an IMS Charging ID and/or an IMS session ID. This action 6030 corresponds to action 406 described with regards to FIG. 4.

Action 6040: The second network node 151 may, when the first UE 120 is engaged in more than one ongoing call sessions, send a request to indicate which call session out of the one or more call sessions the participant is to be added to, to the user of the first UE 120. This action 6040 is similar to action 407 described with regards to FIG. 4.

Action 6050: The second network node 151 may, when the first UE 120 is engaged in more than one ongoing call sessions, obtain an indication of the call session out of the one or more ongoing call sessions that the participant is to be added to, from the user of the first UE 120. This action 6050 corresponds to action 409 described with regards to FIG. 4.

Action 6060: The second network node 151 may, when the first UE 120 is engaged in more than one ongoing call sessions, send a message comprising the identifier for the call session out of the one or more call sessions which the participant is to be added to, to the first network node 150. This action 6060 corresponds to action 410 described with regards to FIG. 4.

Some actions performed by the IMS node 140 in the wireless communications network 100, for handling an addition of a participant to an ongoing call session for a first UE 120, according to embodiments herein will now be described with reference to a flowchart depicted in FIG. 7. The wireless communications network 100 comprises the first network node 150 and the IMS node 140. The ongoing call session is handled by the IMS node 140. The ongoing call session is a session between the first UE 120 and a second UE 121. The second network node 151 may be a DA node. Actions that should be performed in some embodiments only are marked with dashed boxes.

Action 7010: The IMS node 140 receives, from the first network node 150, a request for ongoing call sessions for the first UE 120. This action 7010 corresponds to action 304 described with regards to FIG. 3 and action 404 described with regards to FIG. 4.

Action 7020: The IMS node 140 sends, to the first network node 150, a list of one or more ongoing call sessions for the first UE 120. The list comprises an identifier for identifying each of the one or more ongoing call sessions. This action 7020 corresponds to action 305 described with regards to FIG. 3 and action 405 described with regards to FIG. 4.

Action 7030: The IMS node 140 receives, from the first network node 150, a request to add the participant to one of the one or more ongoing call sessions for the first UE 120. The request comprises the identifier for identifying the ongoing call session to which the participant is to be added and an identification of the participant to add to the ongoing call session. This action 7020 corresponds to action 306 described with regards to FIG. 3 and action 411 described with regards to FIG. 4.

Action 7040: The IMS node 140 may further add the participant to the ongoing call session identified by the received identifier.

To perform the method actions for handling the addition of a participant to an ongoing call session for the first UE 120 handled by the IMS node 140, described above in relation to FIG. 5, the first network node 150 may comprise the following arrangement as depicted in FIG. 8.

The first network node 150 may comprise a processing unit 801, such as e.g. one or more processors, and an obtaining unit 802, as exemplifying hardware units configured to perform the methods described herein. The first network node 150 may further comprise a communication unit 805 for communicating with other network devices, such as e.g. the second network node 151 or the IMS node 140. The communication unit may comprise a sending unit 806 for sending information to network devices and a receiving unit 807 for receiving information from network devices.

The first network node 150 is configured to, e.g. by means of the processing unit 801 and/or the receiving unit 807 being configured to, receive a request to add a participant to an ongoing call session for the first UE 120, from the second network node 151.

The first network node 150 is configured to, e.g. by means of the processing unit 801 and/or the obtaining unit 802 being configured to, obtain a list of one or more ongoing call sessions for the first user from the IMS node 140, wherein the list comprises an identifier for identifying each of the one or more ongoing call sessions.

The first network node 150 is configured to, e.g. by means of the processing unit 801 and/or the sending unit 806 being configured to, send a request to add the participant to one of the one or more ongoing call sessions for the first UE 120, to the IMS node 140. The request comprises the identifier for identifying the call session to which the participant is to be added and an identification of the participant to add to the ongoing call session.

The first network node 150 may, when the list obtained from the IMS node 140 comprises more than one ongoing call sessions, further be configured to, e.g. by means of the processing unit 801 and/or the sending unit 806 being configured to, send a request, to the second network node 151, to indicate the call session out of the more than one ongoing call sessions to which the participant is to be added. The message may comprise the identifier for identifying each of the more than one ongoing call sessions.

The first network node 150 may, when the list obtained from the IMS node 140 comprises more than one ongoing call sessions, further be configured to, e.g. by means of the processing unit 801 and/or the receiving unit 807 being configured to, receive a message comprising the identifier for the call session out of the one or more call sessions which the participant is to be added to, from the second network node 151.

The first network node 150 may further be configured to, e.g. by means of the processing unit 801 and/or the sending unit 806 being configured to, send, to the IMS node 140, the request to add the participant to one of the one or more ongoing call sessions comprising the identifier for the ongoing call session out of the one or more call sessions which the participant is to be added to.

The first network node 150 may further be configured to, e.g. by means of the processing unit 801 and/or the sending unit 806 being configured to, send the identifier for identifying the one or more ongoing call sessions as an IMS Charging ID and/or an IMS session ID.

The first network node 150 may further comprise a memory 808. The memory 808 comprises one or more memory units to be used to store data on, such as system information, configurations and/or applications to perform the methods disclosed herein when being executed, and similar.

Those skilled in the art will also appreciate that the obtaining unit 802 described above may refer to a combination of analog and digital circuits, and/or one or more processors configured with software and/or firmware, e.g. stored in the memory 808, that when executed by the one or more processors such as the processing unit 801 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein performed by the first network node 150 may be implemented through a respective processor or one or more processors, such as the processor 801 of a processing circuitry in the first network node 150 depicted in FIG. 8, together with respective computer program code for performing the functions and actions of the embodiments herein. The program code mentioned above may also be provided as a computer program product, for instance in the form of a data carrier carrying computer program code for performing the embodiments herein when being loaded into the first network node 150. One such carrier may be in the form of a CD ROM disc. It is however feasible with other data carriers such as a memory stick. The computer program code may furthermore be provided as pure program code on a server and downloaded to the first network node 150.

Figure 5:
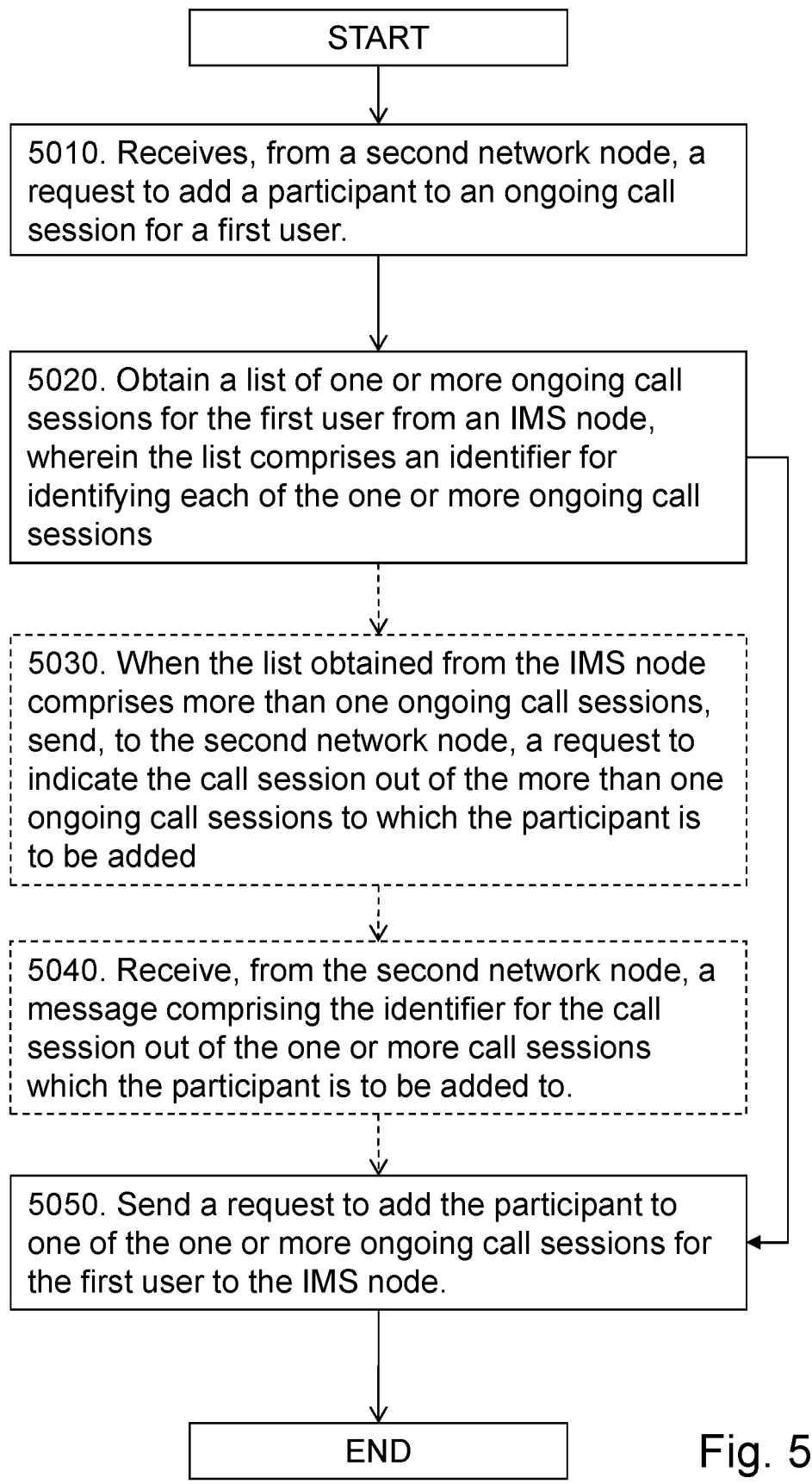
FIG. 5 is a flowchart depicting a method performed by a first network node according to embodiments herein.

The embodiments herein for handling the addition of a participant to an ongoing call session for the first UE 120 handled by the IMS node 140 may be implemented through a respective processor or one or more processors of a processing circuitry in the first network node 150 as depicted in FIG. 9, which processing circuitry is configured to perform the method actions according to FIG. 5 and the embodiments described above for the first network node 150.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the first network node 150. One such carrier may be in the form of a CD ROM disc. It is however feasible with other data carriers such as e.g. a memory stick. The computer program code may furthermore be provided as pure program code on a server and downloaded to the first network node 150.

The first network node 150 may further comprise a memory. The memory may comprise one or more memory units to be used to store data on, such as the numbers determined to be related to a non-legitimate device, software, patches, system information (SI), configurations, diagnostic data, performance data and/or applications to perform the methods disclosed herein when being executed, and similar.

The method according to the embodiments described herein for the first network node 150 may be implemented by means of e.g. a computer program product 809, 901 or a computer program, comprising instructions, i.e., software code portions, which, when executed on at least one processor, cause at least one processor to carry out the actions described herein, as performed by the first network node 150. The computer program product 809, 901 may be stored on a computer-readable storage medium 810, 902, e.g. a disc or similar. The computer-readable storage medium 810, 902, having stored thereon the computer program, may comprise instructions which, when executed on at least one processor, cause the at least one processor to carry out the actions described herein, as performed by the first network node 150. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the first network node 150.

The first network node 150 described in the embodiments herein may also be implemented in a cloud. Although the method actions performed by the first network node 150 herein are discussed in the context of a core network node, such as e.g. the IMS node 140, the method may also be performed by a radio access node or a distributed node comprised in a first cloud, such as e.g. a server and/or a datacenter. The method actions may e.g. be performed by a logical function, which may be a centralized service hosted on the core network node or the distributed node.

To perform the method actions for handling the addition of a participant to an ongoing call session for the first UE 120 handled by the IMS node 140, described above in relation to FIG. 6, the second network node 151 may comprise the following arrangement as depicted in FIG. 10. The second network node 151 may e.g. be a DA node.

The wireless communications network comprises the first network node 150 and the IMS node 140. The ongoing call session is handled by the IMS node 140, wherein the ongoing call session is a session between the first UE 120 and a second UE 121.

The second network node 151 may comprise a processing unit 1001, such as e.g. one or more processors, and an obtaining unit 1002, as exemplifying hardware units configured to perform the methods described herein. The second network node 151 may further comprise a communication unit 1005 for communicating with other network devices, such as e.g. the first network node 150 or the IMS node 140. The communication unit may comprise a sending unit 1006 for sending information to network devices and a receiving unit 1007 for receiving information from network devices.

The second network node 151 is configured to, e.g. by means of the processing unit 1001 and/or the obtaining unit 1002 and/or the receiving unit 1007 being configured to, obtain, from a user of the first UE 120, a request to add a participant to the ongoing call session.

The second network node 151 is configured to, e.g. by means of the processing unit 1001 and/or the sending unit 1006 being configured to, send, to the first network node 150, a request to add the participant to the ongoing call session for the first UE 120.

The second network node 151 may further be configured to, e.g. by means of the processing unit 1001 and/or the receiving unit 1007 being configured to, receive, when the first UE 120 is engaged in more than one ongoing call sessions, a request from the first network node 150 to indicate the call session out of the more than one ongoing call sessions to which the participant is to be added. The message may comprise the identifier for identifying each of the more than one ongoing call sessions.

The second network node 151 may further be configured to, e.g. by means of the processing unit 1001 and/or the sending unit 1006 being configured to, send a request to indicate which call session out of the one or more call sessions the participant is to be added to, to the user of the first UE 120.

The second network node 151 may further be configured to, e.g. by means of the processing unit 1001 and/or the obtaining unit 1002 and/or the receiving unit 1007 being configured to obtain, from the user of the first UE 120, an indication of the call session out of the one or more ongoing call sessions that the participant is to be added to.

The second network node 151 is configured to, e.g. by means of the processing unit 1001 and/or the sending unit 1006 being configured to, send, to the first network node 150, a message comprising the identifier for the call session out of the one or more call sessions which the participant is to be added to.

The second network node 151 may further comprise a memory 1008. The memory 1008 comprises one or more memory units to be used to store data on, such as system information, configurations and/or applications to perform the methods disclosed herein when being executed, and similar.

Those skilled in the art will also appreciate that the obtaining unit 1002 described above may refer to a combination of analog and digital circuits, and/or one or more processors configured with software and/or firmware, e.g. stored in the memory 1008, that when executed by the one or more processors such as the processing unit 1001 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein performed by the second network node 151 may be implemented through a respective processor or one or more processors, such as the processor 1001 of a processing circuitry in the second network node 151 depicted in FIG. 10, together with respective computer program code for performing the functions and actions of the embodiments herein. The program code mentioned above may also be provided as a computer program product, for instance in the form of a data carrier carrying computer program code for performing the embodiments herein when being loaded into the second network node 151. One such carrier may be in the form of a CD ROM disc. It is however feasible with other data carriers such as a memory stick. The computer program code may furthermore be provided as pure program code on a server and downloaded to the second network node 151.

Figure 6:
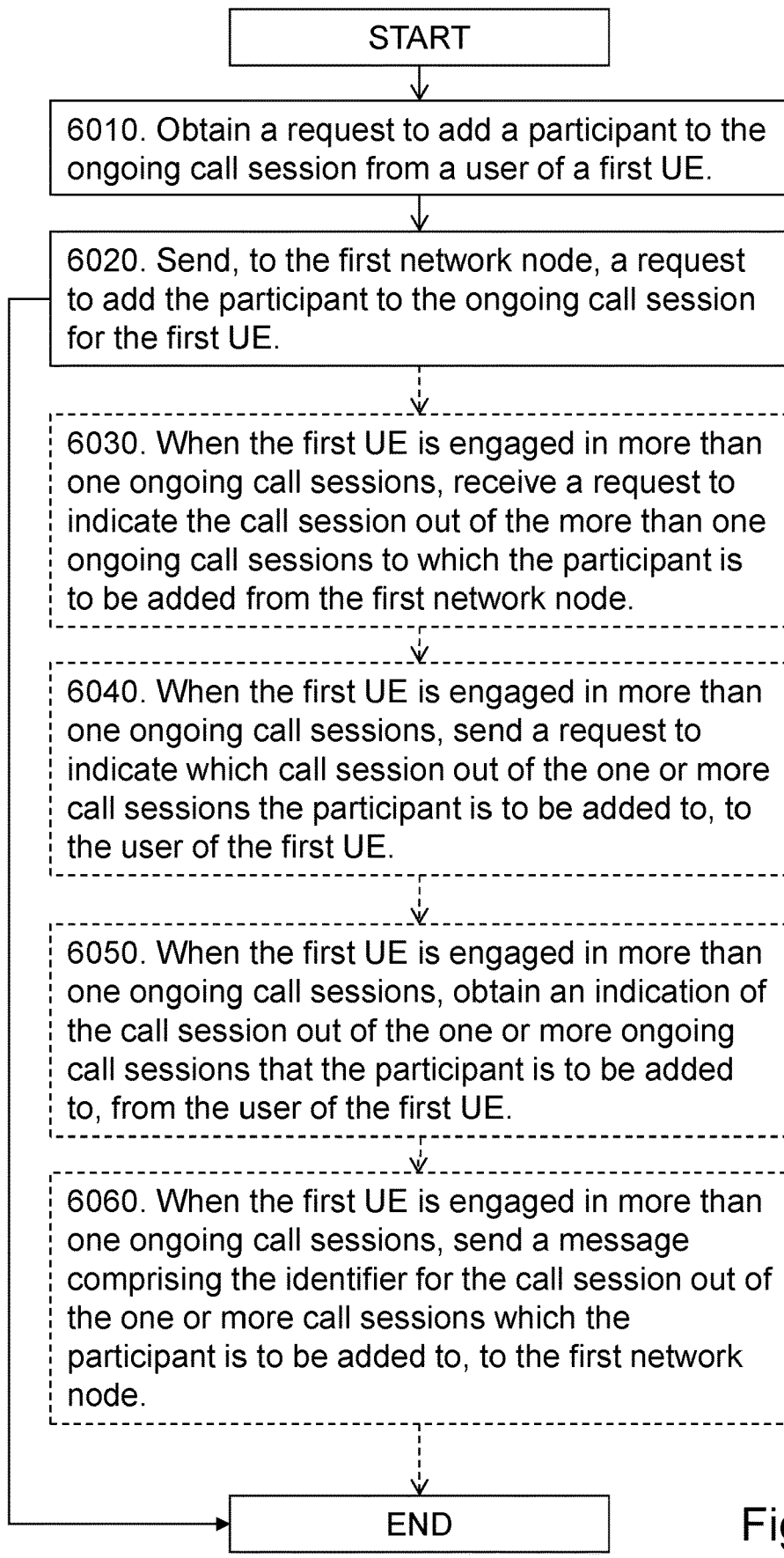
FIG. 6 is a flowchart depicting a method performed by a second network node according to embodiments herein.

The embodiments herein for handling the addition of a participant to an ongoing call session for the first UE 120 handled by the IMS node 140 may be implemented through a respective processor or one or more processors of a processing circuitry in the second network node 151 as depicted in FIG. 11, which processing circuitry is configured to perform the method actions according to FIG. 6 and the embodiments described above for the second network node 151.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the second network node 151. One such carrier may be in the form of a CD ROM disc. It is however feasible with other data carriers such as e.g. a memory stick. The computer program code may furthermore be provided as pure program code on a server and downloaded to the second network node 151.

The second network node 151 may further comprise a memory. The memory may comprise one or more memory units to be used to store data on, such as the list of one or more ongoing call sessions for the first user, software, patches, system information (SI), configurations, diagnostic data, performance data and/or applications to perform the methods disclosed herein when being executed, and similar.

The method according to the embodiments described herein for the second network node 151 may be implemented by means of e.g. a computer program product 1009, 1101 or a computer program, comprising instructions, i.e., software code portions, which, when executed on at least one processor, cause at least one processor to carry out the actions described herein, as performed by the second network node 151. The computer program product 1009, 1101 may be stored on a computer-readable storage medium 1010, 1102, e.g. a disc or similar. The computer-readable storage medium 1010, 1102, having stored thereon the computer program, may comprise instructions which, when executed on at least one processor, cause the at least one processor to carry out the actions described herein, as performed by the second network node 151. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the second network node 151.

The second network node 151 described in the embodiments herein may also be implemented in a cloud. The method actions performed by the first network node 150 herein may also be performed by a core network node, by a radio access node or a distributed node comprised in a first cloud, such as e.g. a server and/or a datacenter. The method actions may e.g. be performed by a logical function, which may be a centralized service hosted on the core network node or the distributed node.

To perform the method actions for handling the addition of a participant to an ongoing call session for the first UE 120 handled by the IMS node 140, described above in relation to FIG. 7, the IMS node 140 may comprise the following arrangement as depicted in FIG. 12.

The IMS node 140 may comprise a processing unit 1201, such as e.g. one or more processors, and a call handling unit 1202, as exemplifying hardware units configured to perform the methods described herein. The IMS node 140 may further comprise a communication unit 1205 for communicating with other network devices, such as e.g. the first network node 150. The communication unit 1205 may comprise a sending unit 1206 for sending information to network devices and a receiving unit 1207 for receiving information from network devices.

The IMS node 140 is configured to, e.g. by means of the processing unit 1201 and/or the receiving unit 1207 being configured to, receive a request for ongoing call sessions for the first UE 120, from the first network node 150.

The IMS node 140 is configured to, e.g. by means of the processing unit 1201 and/or the sending unit 1206 being configured to, send a list of one or more ongoing call sessions for the first user to the first network node 150. The list comprises an identifier for identifying each of the one or more ongoing call sessions.

The IMS node 140 is configured to, e.g. by means of the processing unit 1201 and/or the receiving unit 1207 being configured to, receive, from the first network node 150, a request to add the participant to one of the one or more ongoing call sessions for the first UE 120. The request comprises the identifier for identifying the ongoing call session to which the participant is to be added and an identification of the participant to add to the ongoing call session.

The IMS node 140 may further be configured to, e.g. by means of the processing unit 1201 and/or the call handling unit 1202 being configured to, add the participant to the ongoing call session identified by the received identifier.

The IMS node 140 may further comprise a memory 1208. The memory 1208 comprises one or more memory units to be used to store data on, such as system information, configurations and/or applications to perform the methods disclosed herein when being executed, and similar.

Those skilled in the art will also appreciate that the call handling unit 1202 described above may refer to a combination of analog and digital circuits, and/or one or more processors configured with software and/or firmware, e.g. stored in the memory 1208, that when executed by the one or more processors such as the processing unit 1201 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein performed by the IMS node 140 may be implemented through a respective processor or one or more processors, such as the processor 1201 of a processing circuitry in the IMS node 140 depicted in FIG. 12, together with respective computer program code for performing the functions and actions of the embodiments herein. The program code mentioned above may also be provided as a computer program product, for instance in the form of a data carrier carrying computer program code for performing the embodiments herein when being loaded into the IMS node 140. One such carrier may be in the form of a CD ROM disc. It is however feasible with other data carriers such as a memory stick. The computer program code may furthermore be provided as pure program code on a server and downloaded to the IMS node 140.

Figure 7:
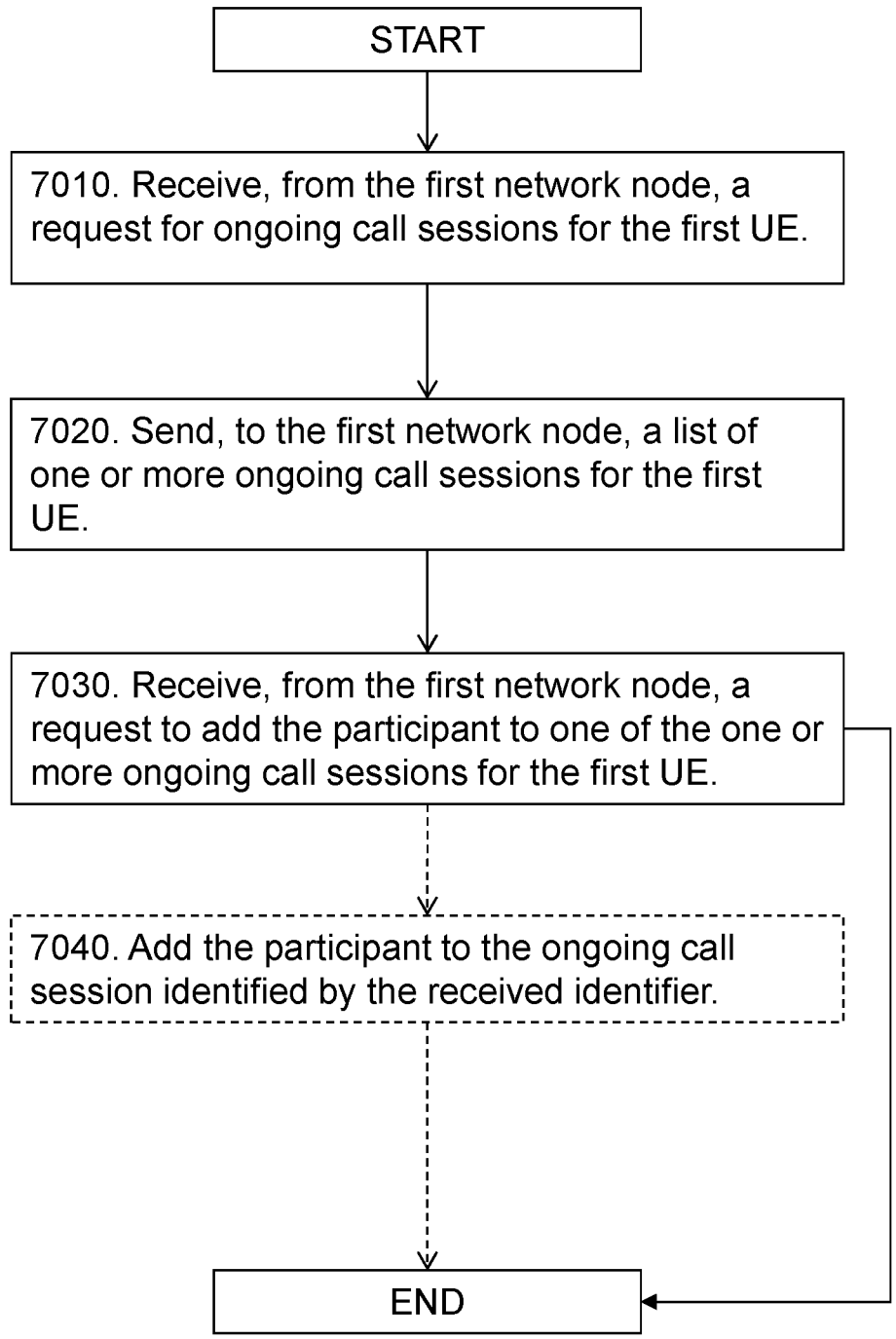
FIG. 7 is a flowchart depicting a method performed by an IMS node according to embodiments herein.

The embodiments herein for handling the addition of a participant to an ongoing call session for the first UE 120 handled by the IMS node 140 may be implemented through a respective processor or one or more processors of a processing circuitry in the IMS node 140 as depicted in FIG. 13, which processing circuitry is configured to perform the method actions according to FIG. 7 and the embodiments described above for the IMS node 140.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the IMS node 140. One such carrier may be in the form of a CD ROM disc. It is however feasible with other data carriers such as e.g. a memory stick. The computer program code may furthermore be provided as pure program code on a server and downloaded to the IMS node 140.

The IMS node 140 may further comprise a memory. The memory may comprise one or more memory units to be used to store data on, such as the list of one or more ongoing call sessions for the first user, software, patches, system information (SI), configurations, diagnostic data, performance data and/or applications to perform the methods disclosed herein when being executed, and similar.

The method according to the embodiments described herein for the IMS node 140 may be implemented by means of e.g. a computer program product 1209, 1301 or a computer program, comprising instructions, i.e., software code portions, which, when executed on at least one processor, cause at least one processor to carry out the actions described herein, as performed by the IMS node 140. The computer program product 1209, 1301 may be stored on a computer-readable storage medium 1210, 1302, e.g. a disc or similar. The computer-readable storage medium 1210, 1302, having stored thereon the computer program, may comprise instructions which, when executed on at least one processor, cause the at least one processor to carry out the actions described herein, as performed by the IMS node 140. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the IMS node 140.

The IMS node 140 described in the embodiments herein may also be implemented in a cloud, in a core network node or in a distributed node comprised in a first cloud, such as e.g. a server and/or a datacenter. The method actions may e.g. be performed by a logical function, which may be a centralized service hosted on the core network node or the distributed node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

When using the word "comprise" or "comprising" it shall be interpreted as non-limiting, i.e. meaning "consist at least of".

Further Extensions and Variations

Figure 14:
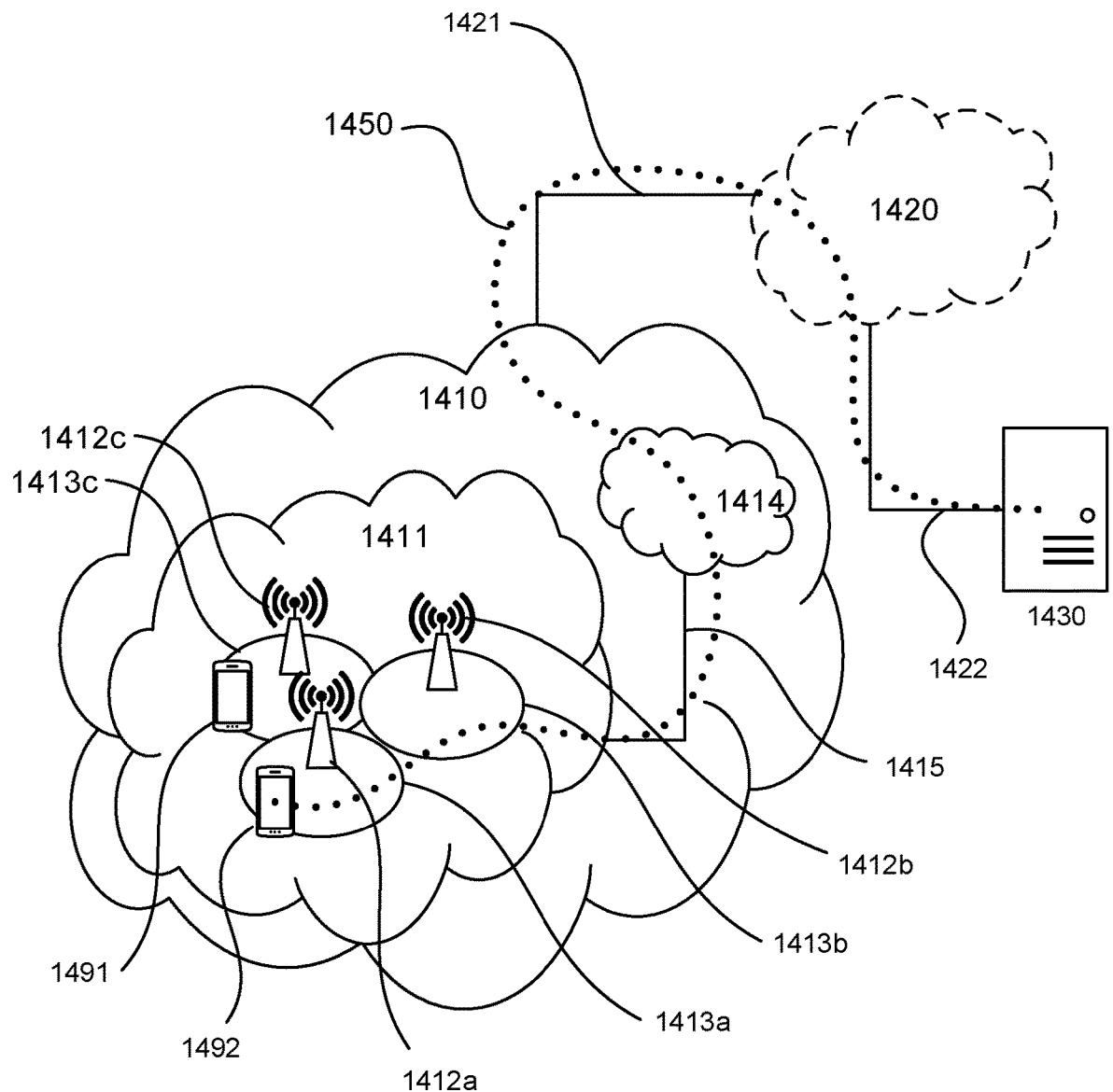
FIG. 14 is a schematic block diagram illustrating a host computer communicating via a base station with a user equipment over a partially wireless connection in accordance with some embodiments.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, e.g. the network node 110, 111, such as NBs, eNBs, gNBs or other types of wireless access points, each defining a corresponding coverage area 1413a, 1413b, 1413c, such as e.g. the cells 130, 131. Each base station 1412a, 1412b, 1412c is connectable to core network 1414 over a wired or wireless connection 1415. A first UE 1491, such as the UE 120 or a dedicated DA device, located in coverage area 1413c is configured to wirelessly connect to, or be paged by, the corresponding base station 1412c. A second UE 1492, such as the UE 121, in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430, such as e.g. the second network node 151, may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink (UL) and downlink (DL) communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512, such as e.g. the DA platform. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

Figure 15:
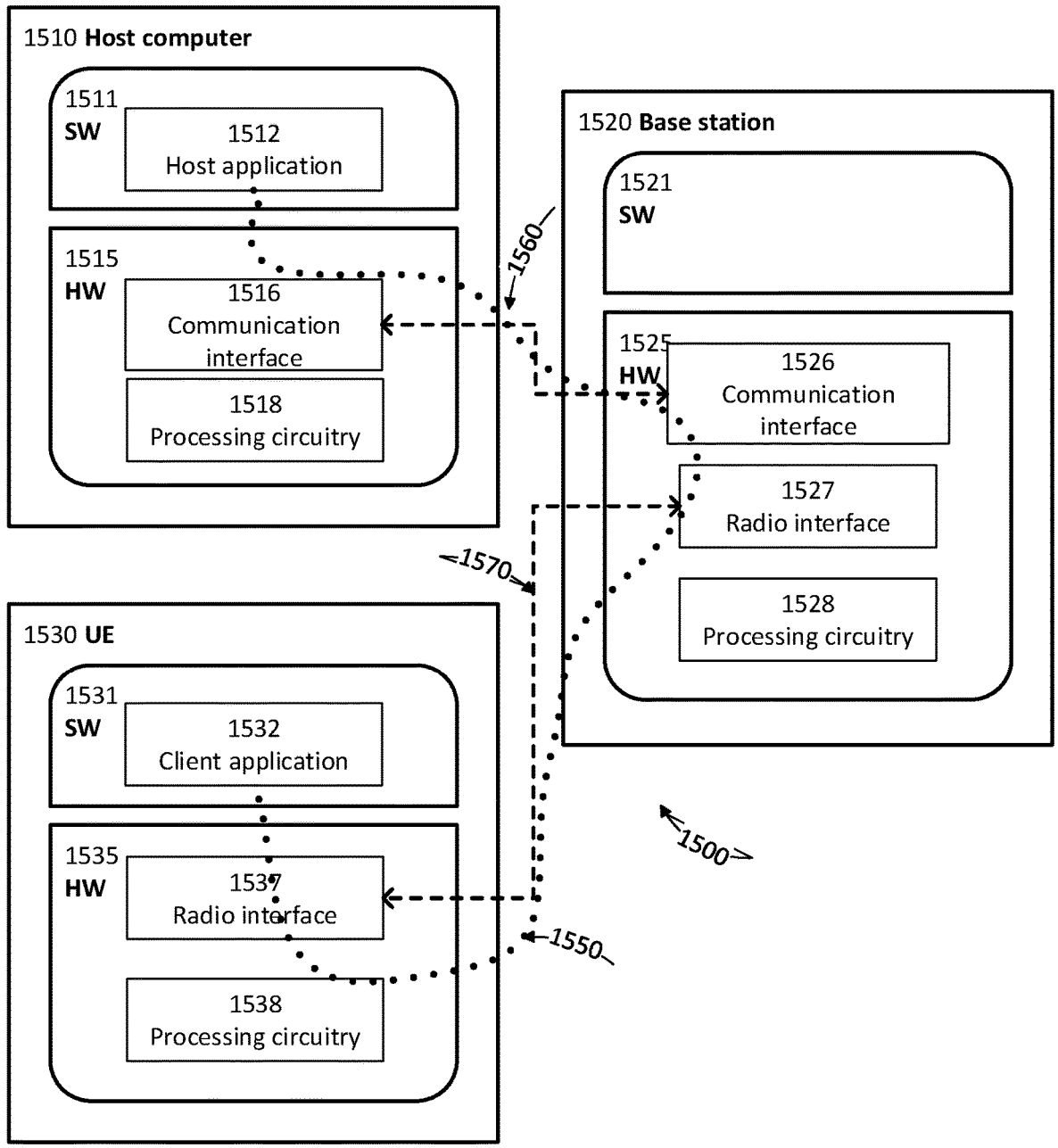
FIG. 15 is a schematic overview of a host computer communicating via a base station with a user equipment over a partially wireless connection in accordance with some embodiments.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, by dynamically adjusting the amounts of resources allowed for uplink and downlink respectively based on their needs while keeping the total amount of allowed resources fixed, the teachings of these embodiments may improve hardware utilization and thereby provide benefits such as data throughput in both uplink and downlink.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method performed by a first network node in a wireless communications network, for handling an addition of a participant to an ongoing call session for a first User Equipment (UE) handled by an IP Multimedia Subsystem (IMS) node, wherein the ongoing call session is a session between the first UE and a second UE, the method comprising:

receiving, from a second network node, a request to add a participant to an ongoing call session for the first UE;

obtaining a list of one or more ongoing call sessions for the first UE from the IMS node, wherein the list comprises an identifier for identifying each of the one or more ongoing call sessions;

sending, to the IMS node, a request to add the participant to one of the one or more ongoing call sessions for the first UE, wherein the request comprises the identifier for identifying the call session to which the participant is to be added and an identification of the participant to add to the ongoing call session.

2. The method of claim 1, wherein the list obtained from the IMS node comprises more than one ongoing call sessions and the method further comprises:

sending, to the second network node, a request to indicate the call session out of the more than one ongoing call sessions to which the participant is to be added, wherein the request comprises an identifier for identifying each of the more than one ongoing call sessions;

receiving, from the second network node, a message comprising the identifier for the call session out of the one or more call sessions to which the participant is to be added; and wherein the step of sending the request to the IMS node to add the participant to one of the one or more ongoing call sessions comprises sending the identifier for the ongoing call session out of the one or more call sessions to which the participant is to be added.

3. The method of claim 1, wherein the identifier for identifying each of the one or more ongoing call sessions is an IMS Charging ID and/or an IMS session ID.

4. The method of claim 1, wherein the second network node is a Digital Assistant (DA) node.

5. The method of claim 1, wherein the IMS node is Billing Support System (BSS) node.

6. A method performed by a second network node in a wireless communications network, for handling an addition of a participant to an ongoing call session for a first User Equipment (UE) wherein the ongoing call session is handled by an IP Multimedia Subsystem (IMS) node and wherein the ongoing call session is a session between the first UE and a second UE, the first UE and the second UE being distinct from the second network node, the method comprising:

obtaining, from a user of the first UE, a request to add a participant to the ongoing call session;

sending, to a first network node distinct from the second network node and from the first and second UEs, a request to add the participant to the ongoing call session for the first UE.

7. The method of claim 6, wherein, when the first UE is engaged in more than one ongoing call sessions, the method further comprises:

receiving, from the first network node, a request to indicate the call session out of the more than one ongoing call sessions to which the participant is to be added, wherein the request comprises an identifier for identifying each of the more than one ongoing call sessions;

sending, to the user of the first UE, a request to indicate the call session out of the one or more call sessions to which the participant is to be added;

obtaining, from the user of the first UE, an indication of the call session out of the one or more ongoing call sessions to which the participant is to be added;

sending, to the first network node, a message comprising the indication for the call session out of the one or more call sessions to which the participant is to be added.

8. The method of claim 7, wherein the identifier for identifying each of the one or more ongoing call sessions is an IMS Charging ID and/or an IMS session ID.

9. The method of claim 6, wherein the second network node is a Digital Assistant (DA) node.

10. A method performed by an IP Multimedia Subsystem (IMS) node in a wireless communications network, for handling an addition of a participant to an ongoing call session for a first User Equipment (UE) wherein the ongoing call session is handled by the IMS node, wherein the ongoing call session is a session between the first UE and a second UE, the method comprising:
    receiving, from the first network node, a request for ongoing call sessions for the first UE;
    send, to the first network node, a list of one or more ongoing call sessions for the first UE from the IMS node, wherein the list comprises an identifier for identifying each of the one or more ongoing call sessions;
    receiving, from the first network node, a request to add the participant to one of the one or more ongoing call sessions for the first UE, wherein the request comprises the identifier for identifying the ongoing call session to which the participant is to be added and an identification of the participant to add to the ongoing call session.

11. The method of claim 10, wherein the method further comprises adding the participant to the ongoing call session identified by the received identifier.

12. A first network node in a wireless communications network, for handling an addition of a participant to an ongoing call session for a first User Equipment (UE) handled by an IP Multimedia Subsystem (IMS) node, wherein the ongoing call session is a session between the first UE and a second UE, the first network node comprising:
    communication interface circuitry for communicating with one or more other network nodes; and
    processing circuitry operatively coupled to the communication interface circuitry; and
    memory operatively coupled to the processing circuitry and storing program instructions and configured to, upon execution, cause the first network node to:
        receive, from a second network node, a request to add a participant to an ongoing call session for the first UE;
        obtain a list of one or more ongoing call sessions for the first user from the IMS node, wherein the list comprises an identifier for identifying each of the one or more ongoing call sessions;
        send, to the IMS node, a request to add the participant to one of the one or more ongoing call sessions for the first UE, wherein the request comprises the identifier for identifying the call session to which the participant is to be added and an identification of the participant to add to the ongoing call session.

13. The first network node of claim 12, wherein the program instructions are further configured to cause the first network node to, when the list obtained from the IMS node comprises more than one ongoing call sessions:
    send, to the second network node, a request to indicate the call session out of the more than one ongoing call sessions to which the participant is to be added, wherein the request comprises an identifier for identifying each of the more than one ongoing call sessions;
    receive, from the second network node, a message comprising the identifier for the call session out of the one or more call sessions to which the participant is to be added; and
    send, to the IMS node, the request to add the participant to one of the one or more ongoing call sessions comprising the identifier for the ongoing call session out of the one or more call sessions to which the participant is to be added.

14. The first network node of claim 12, wherein the identifier for identifying each of the one or more ongoing call sessions is an IMS Charging ID and/or an IMS session ID.

15. A second network node in a wireless communications network, for handling an addition of a participant to an ongoing call session for a first User Equipment (UE), wherein the ongoing call session is handled by an IP Multimedia Subsystem (IMS) node, wherein the ongoing call session is a session between the first UE and a second UE, the first UE and second UE being distinct from the second network node, the second network node comprising:
    communication interface circuitry for communicating with one or more other network nodes; and
    processing circuitry operatively coupled to the communication interface circuitry; and
    memory operatively coupled to the processing circuitry and storing program instructions and configured to, upon execution, cause the second network node to:
        obtain, from a user of the first UE, a request to add a participant to the ongoing call session;
        send, to a first network node distinct from the second network node and from the first and second UEs, a request to add the participant to the ongoing call session for the first UE.

16. The second network node of claim 15, wherein the program instructions are further configured to cause the second network node to, when the first UE is engaged in more than one ongoing call sessions:
    receive, from the first network node, a request to indicate the call session out of the more than one ongoing call sessions to which the participant is to be added, wherein the message request comprises an identifier for identifying each of the more than one ongoing call sessions;
    send, to the user of the first UE, a request to indicate to which call session out of the one or more call sessions the participant is to be added;
    obtain, from the user of the first UE, an indication of the call session out of the one or more ongoing call sessions to which the participant is to be added;
    send, to the first network node, a message comprising the identifier for the call session out of the one or more call sessions to which the participant is to be added.

17. The method of claim 15, wherein the identifier for identifying each of the one or more ongoing call sessions is an IMS Charging ID and/or an IMS session ID.

18. The method of claim 15, wherein the second network node is a Digital Assistant (DA) node.

19. An IP Multimedia Subsystem (IMS) node in a wireless communications network, for handling an addition of a participant to an ongoing call session for a first User Equipment (UE), wherein the ongoing call session is handled by the IMS node, wherein the ongoing call session is a session between the first UE and a second UE, the IMS node comprising:
    communication interface circuitry for communicating with one or more other network nodes; and processing circuitry operatively coupled to the communication interface circuitry; and memory operatively coupled to the processing circuitry and storing program instructions and configured to, upon execution, cause the IMS node to:

receive, from the first network node, a request for ongoing call sessions for the first UE;

send, to the first network node, a list of one or more ongoing call sessions for the first user from the IMS node, wherein the list comprises an identifier for identifying each of the one or more ongoing call sessions;

receive, from the first network node, a request to add the participant to one of the one or more ongoing call sessions for the first UE, wherein the request comprises the identifier for identifying the ongoing call session to which the participant is to be added and an identification of the participant to add to the ongoing call session.

20. The IMS node of claim 19, wherein the program instructions are further configured to cause the IMS node to add the participant to the ongoing call session identified by the received identifier.

\* \* \* \* \*